US 11,802,725 B2

(12) United States Patent
Okano

(10) Patent No.: US 11,802,725 B2
(45) Date of Patent: Oct. 31, 2023

(54) AIR-CONDITIONING APPARATUS

(71) Applicant: Mitsubishi Electric Corporation, Tokyo (JP)

(72) Inventor: Hiroyuki Okano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 165 days.

(21) Appl. No.: 16/631,556

(22) PCT Filed: Sep. 15, 2017

(86) PCT No.: PCT/JP2017/033429
§ 371 (c)(1),
(2) Date: Jan. 16, 2020

(87) PCT Pub. No.: WO2019/053872
PCT Pub. Date: Mar. 21, 2019

(65) Prior Publication Data
US 2020/0200454 A1    Jun. 25, 2020

(51) Int. Cl.
*F25B 49/02* (2006.01)
*F25B 13/00* (2006.01)
(Continued)

(52) U.S. Cl.
CPC ............. *F25B 49/02* (2013.01); *F25B 13/00* (2013.01); *F25B 41/34* (2021.01); *F25B 41/39* (2021.01);
(Continued)

(58) Field of Classification Search
CPC .. F25B 41/31; F25B 13/00; F25B 2313/0233; F25B 2313/0252; F25B 2313/0253;
(Continued)

(56) References Cited

U.S. PATENT DOCUMENTS

| | | | |
|---|---|---|---|
| 2009/0165482 A1* | 7/2009 | Ko | F25B 1/10 62/222 |
| 2013/0118197 A1* | 5/2013 | Kibo | F25B 1/00 62/222 |

(Continued)

FOREIGN PATENT DOCUMENTS

| | | |
|---|---|---|
| JP | H05-172433 A | 7/1993 |
| JP | 2007-225264 A | 9/2007 |

(Continued)

OTHER PUBLICATIONS

International Search Report of the International Searching Authority dated Dec. 12, 2017 for the corresponding International application No. PCT/JP2017/033429 (and English translation).

*Primary Examiner* — Larry L Furdge
(74) *Attorney, Agent, or Firm* — POSZ LAW GROUP, PLC

(57) ABSTRACT

The air-conditioning apparatus includes the plurality of heat source apparatuses; a plurality of indoor units each including an indoor heat exchanger and each configured to perform one of cooling and heating operations; a relay device connected to the heat source apparatuses by a high pressure pipe and a low pressure pipe and configured to distribute refrigerant flowing therein from the heat source apparatuses to the plurality of indoor units; and a controller configured to control operations of the heat source apparatuses. The relay device includes a relay device temperature detecting unit configured to detect a temperature of the refrigerant flowing through the bypass pipe. During the heating main operation, the controller changes an opening degree of each of the outdoor side expansion devices based on the temperature detected by the relay device temperature detecting unit.

20 Claims, 4 Drawing Sheets

(51) Int. Cl.
*F25B 41/34* (2021.01)
*F25B 41/39* (2021.01)

(52) U.S. Cl.
CPC ............... *F25B 2313/0233* (2013.01); *F25B 2313/0252* (2013.01); *F25B 2313/0253* (2013.01); *F25B 2600/2513* (2013.01)

(58) Field of Classification Search
CPC .. F25B 2600/2513; F25B 41/39; F25B 40/00; F25B 2313/0231; F25B 2313/0234; F25B 2313/0311; F25B 2313/0314; F25B 2400/075; F25B 49/02; F25B 2313/0291; F25B 2700/1931; F25B 2700/1933; F25B 2700/21151; F25B 2700/21152; F25B 1/00; F24F 11/30

See application file for complete search history.

(56) References Cited

U.S. PATENT DOCUMENTS

| | | | |
|---|---|---|---|
| 2015/0176879 A1* | 6/2015 | Okano | F25B 13/00 62/160 |
| 2015/0316284 A1* | 11/2015 | Tanaka | F24F 5/001 62/196.1 |
| 2016/0245540 A1* | 8/2016 | Koge | F24F 3/06 |
| 2017/0082334 A1* | 3/2017 | Kawagoe | F25B 1/00 |

FOREIGN PATENT DOCUMENTS

| | | |
|---|---|---|
| JP | 2011-027314 A | 2/2011 |
| JP | 5404229 B2 | 1/2014 |
| WO | 2017/094173 A1 | 6/2017 |

* cited by examiner

AIR-CONDITIONING APPARATUS

CROSS REFERENCE TO RELATED APPLICATION

This application is a U.S. national stage application of PCT/JP2017/033429 filed on Sep. 15, 2017, the contents of which are incorporated herein by reference.

TECHNICAL FIELD

The present invention relates to an air-conditioning apparatus having a relay device configured to distribute refrigerant flowing therein from a heat source apparatus to a plurality of indoor units.

BACKGROUND ART

To address the need to increase capacities of air-conditioning apparatuses, air-conditioning apparatuses have been developed to include multiple heat source apparatuses. In such air-conditioning apparatuses including multiple heat source apparatuses, refrigerant may be unevenly distributed among the heat source apparatuses during a room-heating operation due to various causes. To cope with this situation, air-conditioning apparatuses have conventionally been proposed in which unevenness of the refrigerant among the heat source apparatuses can be corrected (by refrigerant equalization). In Patent Literature 1, the refrigerant flowing into multiple heat source apparatuses is regulated by the opening degrees of flow control valves, so that the distribution of the refrigerant among the heat source apparatuses is controlled, by arranging the values of the degrees of superheat of the discharges to fall within a prescribed range.

CITATION LIST

Patent Literature

Patent Literature 1: Japanese Unexamined Patent Application Publication No. 2007-225264

SUMMARY OF INVENTION

Technical Problem

In the refrigerant equalization control in Patent Literature 1, the control is exercised to keep the temperature values of the discharges from the compressors in the heat source apparatuses within the prescribed range. However, when the flow control valves are narrowed excessively, the evaporating temperature of the evaporators in the room-cooling indoor units (hereinafter "cooling indoor units") rises, and the cooling capacity is therefore degraded. On the contrary, in the refrigerant equalization control of Patent Literature 1, when the flow control valves are opened excessively to keep the temperature values of the discharges from the compressors within the prescribed range, the temperature of the liquid pipes in the cooling indoor units may fall below the freezing point in some situations. Thus, a problem arises where the air-conditioning apparatus transitions into a protection control mode to avoid the freezing, and the air-conditioning capacity is therefore degraded.

To solve the problem described above, in relation to refrigeration cycle devices including a plurality of heat source apparatuses, it is an object of the present invention to provide an air-conditioning apparatus capable of preventing cooling indoor units from having the cooling capacity degraded and from being frozen during a heating main operation, while appropriately controlling the distribution of refrigerant among the heat source apparatuses.

Solution to Problem

An air-conditioning apparatus according to one embodiment of the present invention includes: a plurality of heat source apparatuses each including a compressor, an outdoor side expansion device, a heat source side heat exchanger, and an accumulator; a plurality of indoor units each including an indoor heat exchanger and each configured to perform one of cooling and heating operations; a relay device connected to the heat source apparatuses by a high pressure pipe and a low pressure pipe and configured to distribute refrigerant flowing therein from the heat source apparatuses to the plurality of indoor units; and a controller configured to control operations of the heat source apparatuses. During a heating main operation in which one or more of the plurality of indoor units perform the cooling operation, whereas remaining indoor units perform the heating operation, the relay device includes: a gas-liquid separator configured to separate the refrigerant flowing from the high pressure pipe into gas refrigerant in a gas state and liquid refrigerant in a liquid state; a gas pipe configured to supply the gas refrigerant exiting the gas-liquid separator to the indoor units performing the heating operation from among the plurality of indoor units; a liquid pipe configured to supply the liquid refrigerant flowing from the gas-liquid separator to the one or more indoor units performing the cooling operation from among the plurality of indoor units; a bypass pipe branching off from the liquid pipe and connected to the low pressure pipe; a bypass flow control valve configured to regulate a flow volume of the refrigerant flowing through the bypass pipe; and a relay device temperature detecting unit configured to detect a temperature of the refrigerant flowing through the bypass pipe. The controller changes an opening degree of each of the outdoor side expansion devices based on the temperature detected by the relay device temperature detecting unit.

Advantageous Effects of Invention

According to this embodiment of the present invention, it is possible to obtain the air-conditioning apparatus capable of controlling the distribution of the refrigerant by controlling the values of the degrees of superheat of the discharges from the compressors to be within the prescribed range among the heat source apparatuses and also capable of preventing the cooling indoor units from being frozen and of maintaining the cooling capacity by controlling the temperature of the liquid pipe to be within the prescribed range.

DESCRIPTION OF EMBODIMENTS

Embodiment 1

Figure 1:
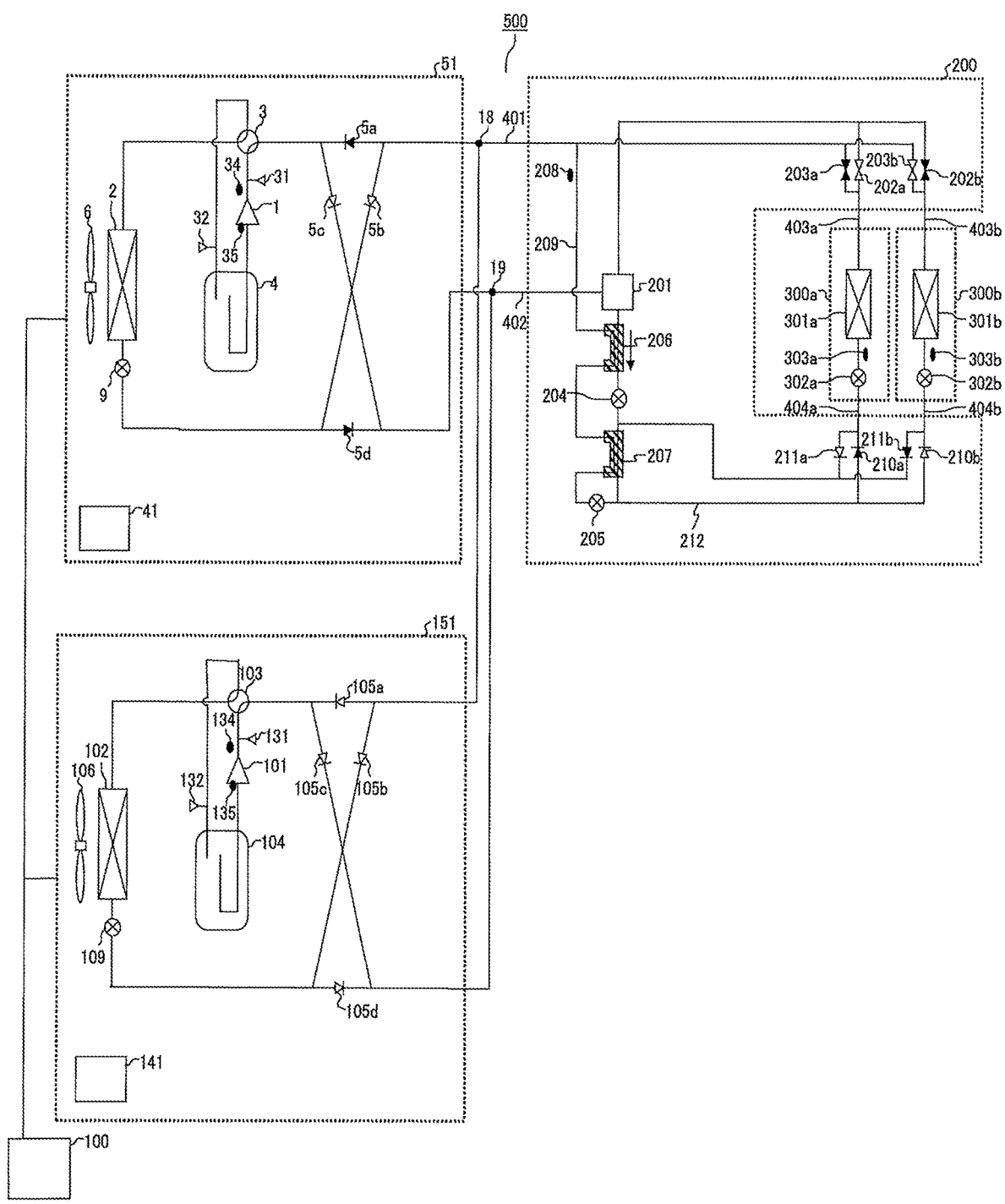
FIG. 1 is a refrigerant circuit diagram showing a refrigerant circuit of an air-conditioning apparatus according to Embodiment 1 of the present invention.

FIG. 1 is a refrigerant circuit diagram showing a refrigerant circuit of an air-conditioning apparatus according to Embodiment 1 of the present invention. A circuit configuration of an air-conditioning apparatus 500 will be explained with reference to FIG. 1.

The air-conditioning apparatus 500 is configured to perform a room-cooling operation (hereinafter "cooling operation") and a room-heating operation (hereinafter, "heating operation") by using a refrigeration cycle (a heat pump cycle) in which refrigerant is circulated. In this situation, the air-conditioning apparatus 500 shown in FIG. 1 includes heat source apparatuses (a heat source apparatus 51 and another heat source apparatus 151) serving as heat source side units. Functional component parts identical to one another are installed in the heat source apparatuses. For this reason, in the description below, when there is no need to distinguish between the two heat source apparatuses, the reference characters of the functional component parts of the heat source apparatus 51 will be indicated without parentheses, while the reference characters of the functional component parts of the heat source apparatus 151 will be indicated in parentheses. The air-conditioning apparatus 500 shown in FIG. 1 is merely an example. The air-conditioning apparatus 500 may include three or more heat source apparatuses and may include two or more indoor units serving as load side units.

The air-conditioning apparatus 500 includes the two heat source apparatuses (the heat source apparatus 51 and the heat source apparatus 151) and two indoor units (an indoor unit 300a and another indoor unit 300b). Further, a refrigeration cycle circuit is structured as a result of the heat source apparatus 51 and the heat source apparatus 151 being connected in parallel to the two indoor units (the indoor unit 300a and the indoor unit 300b) by a low pressure pipe 401 and a high pressure pipe 402.

The heat source apparatus 51 (151) includes a compressor 1 (101), a heat source side heat exchanger 2 (102), a four-way valve 3 (103), an accumulator 4 (104), and check valves 5a, 5b, 5c, and 5d (105a, 105b, 105c, and 105d). The heat source apparatus 51 (151) further includes a discharge pressure detecting unit 31 (131), a suction pressure detecting unit 32 (132), a discharge temperature detecting unit 34 (134), and a compressor shell temperature detecting unit 35 (135).

To the discharge side of the compressor 1 (101), the four-way valve 3 (103) is connected. The four-way valve 3 (103) is configured to switch the flow path of the refrigerant discharged from the compressor 1 (101) into one selected from between: a flow path flowing to the heat source side heat exchanger 2 (102); and a flow path flowing to the indoor units 300 (the indoor unit 300a and the indoor unit 300b). Further, the four-way valve 3 (103) is also connected to the accumulator 4 (104) and is configured to forward the refrigerant flowing therein from the heat source side heat exchanger 2 (102) or the indoor units 300 (the indoor unit 300a and the indoor unit 300b) to the accumulator 4 (104).

The air-conditioning apparatus of Embodiment 1 is capable of performing the cooling operation and the heating operation, with the switching of the four-way valve 3 (103). The four-way valve 3 (103) corresponds to a flow path switching device of the present invention. The flow path switching device, however, does not necessarily have to be a four-way switching valve and may be structured, for example, by combining together two-way valves or similar devices.

To control the flow of the refrigerant, the air-conditioning apparatus 500 of Embodiment 1 further includes a relay device 200 between the heat source apparatus 51 (151) and the indoor units 300 (the indoor unit 300a and the indoor unit 300b). These devices are connected to one another by various types of refrigerant pipes. Further, the plurality of indoor units 300a and 300b are connected in parallel to each other. For example, when the indoor unit 300a, the indoor unit 300b, and so on do not particularly need to be distinguished from each other or do not need to be specified, the subscripts a and b may hereinafter be omitted.

As for the connection by the pipes, the heat source apparatus 51 (151) and the relay device 200 are connected to each other by the low pressure pipe 401 and the high pressure pipe 402. The low pressure pipe 401 connecting the heat source apparatus 51 to the relay device 200 and the low pressure pipe 401 connecting the heat source apparatus 151 to the relay device 200 are joined with each other at a liquid side joint part 18 and a gas side joint part 19. Through the high pressure pipe 402, the refrigerant having high pressure flows from the heat source apparatus 51 side to the relay device 200 side. Further, through the low pressure pipe 401, the refrigerant having lower pressure than the refrigerant flowing through the high pressure pipe 402 flows from the relay device 200 side to the heat source apparatus 51 (151). In this situation, the levels of the pressure being high or low are not defined based on relationships with a reference pressure level (a numerical value). Instead, the pressure levels are expressed as being relatively high or low (including medium levels) within the refrigerant circuit, in accordance with applied pressure of the compressor (101), the control exercised over the open/close (opening degree) state of expansion devices (flow volume limiting devices), and other factors.

In contrast, the relay device 200 and the indoor unit 300a are connected to each other by a gas pipe 403a and a liquid pipe 404a, Similarly, the relay device 200 and the indoor unit 300b are connected to each other by a gas pipe 403b and a liquid pipe 404b. As a result of the pipe connections using the low pressure pipe 401, the high pressure pipe 402, the gas pipes 403 (the gas pipe 403a and the gas pipe 403b), and the liquid pipes 404 (the liquid pipe 404a and the liquid pipe 404b), the refrigerant is circulated among the heat source apparatus 51 (151), the relay device 200, and the indoor units 300, and the refrigerant circuit is thus structured.

The heat source side heat exchanger 2 (102) includes a heat transfer tube through which the refrigerant passes and a fin designed to increase the heat transfer area between the refrigerant flowing through the heat transfer tube and the outside air. The heat source side heat exchanger 2 (102) is configured to exchange heat between the refrigerant and the air (the outside air). For example, during the heating operation, the heat source side heat exchanger 2 (102) functions as an evaporator and, for example, evaporates and vaporizes the refrigerant. In contrast, during the cooling operation, the heat source side heat exchanger 2 (102) functions as a condenser and, for example, condenses and liquefies the refrigerant. In some situations, for example, during a cooling main operation (explained later), an adjustment is made to condense the refrigerant to a state where the two phases of liquid and gas are mixed together (a two-phase gas-liquid state), instead of completely gasifying or liquifying the refrigerant.

The check valves 5a, 5b, 5c, and 5d (105a, 105b, 105c, and 105d) are configured to arrange the circulation path of the refrigerant to be in one direction regardless of the operation mode, by rectifying the flow of the refrigerant by preventing the refrigerant flowing from flowing backward. The check valve 5a (105a) is positioned in the pipe provided between the four-way valve 3 (103) and the low pressure pipe 401 and is configured to allow the refrigerant to flow from the low pressure pipe 401 toward the four-way valve 3 (103). The check valve 5b (105b) is positioned in the pipe provided between the heat source side heat exchanger 2 (102) and the low pressure pipe 401 and is configured to allow the refrigerant to flow from the low pressure pipe 401 toward the heat source side heat exchanger 2 (102). The check valve 5c (105c) is positioned in the pipe provided between the four-way valve 3 (103) and the high pressure pipe 402 and is configured to allow the refrigerant to flow from the four-way valve 3 (103) to the high pressure pipe 402. The check valve 5d (105d) is positioned in the pipe provided between the heat source side heat exchanger 2 (102) and the high pressure pipe 402 and is configured to allow the refrigerant to flow from the heat source side heat exchanger 2 (102) toward the high pressure pipe 402.

Further, in Embodiment 1, the discharge pressure detecting unit 31 (131) and the discharge temperature detecting unit 34 (134) are attached to the pipe provided on the discharge side of the compressor 1 (101). The discharge pressure detecting unit 31 (131) is configured to detect the pressure of the refrigerant on the discharge side of the compressor. The discharge temperature detecting unit 34 (134) is configured to detect the temperature of the refrigerant on the discharge side of the compressor.

Further, the suction pressure detecting unit 32 (132) is attached to the pipe provided on the suction side of the compressor 1 (101). The suction pressure detecting unit 32 (132) is configured to detect the pressure of the refrigerant on the exit side of the heat source side heat exchanger 2 (102) during the heating operation. The compressor shell temperature detecting unit 35 (135) is provided underneath the shell structuring the outer frame of the compressor 1 (101). The compressor shell temperature detecting unit 35 (135) is configured to detect the temperature of refrigerating machine oil accumulating on the inside of the compressor 1 (101). In other words, the compressor shell temperature detecting unit 35 (135) is configured to detect the temperature of the refrigerant on the low-pressure side suctioned into the compressor 1 (101).

The discharge temperature detecting unit 34 (134) and the compressor shell temperature detecting unit 35 (135) are each configured by using a temperature sensor such as a thermistor. Further, the discharge pressure detecting unit 31 (131) and the suction pressure detecting unit 32 (132) are each configured by using a pressure sensor or a similar device.

The heat source apparatus 51 (151) further includes a discharge superheat degree calculating unit 41 (141). The calculating unit may be configured by using hardware such as a circuit device configured to realize the functions thereof or may be configured by using a computation device such as a microcomputer or a CPU and software run by the computation device. The discharge superheat degree calculating unit 41 and the discharge superheat degree calculating unit 141 structure an imbalance detecting unit of the present invention configured to detect the presence/absence of imbalance in the volumes of liquid refrigerant between the accumulator 4 and the accumulator 104.

The discharge superheat degree calculating unit 41 (141) calculates a degree of superheat of the discharge TdSHa (TdSHb) from the compressor 1 (101) by using the discharge pressure detected by the discharge pressure detecting unit 31 (131) and discharge temperature Td1 (Td2) detected by the discharge temperature detecting unit 34 (134), while using Expressions (1) and (2).

$$TdSHa = Td1 - Tc1 \qquad (1)$$

$$TdSHb = Td2 - Tc2 \qquad (2)$$

where Tc1 [degrees C.]: a saturation temperature calculated by performing a saturation conversion on the discharge pressure detected by the discharge pressure detecting unit 31; and Tc2 [degrees C.]: a saturation temperature calculated by performing a saturation conversion on the discharge pressure detected by the discharge pressure detecting unit 131.

The degree of superheat of the discharge from the compressor will hereinafter be expressed as "TdSH".

The air-conditioning apparatus 500 further includes a controller 100 configured to control the entirety of the air-conditioning apparatus 500. The controller 100 acquires the calculation value obtained by the discharge superheat degree calculating unit 41 (141). Based on the acquired calculation values, the controller 100 is configured to exercise various control processes such as the refrigerant equalization control to correct imbalance of the liquid volumes within the accumulator 4 and the accumulator 104 and the control over the four-way valve 3 (103) involved in the switching between the cooling operation and the heating operation.

The controller 100 may be configured by using hardware such as a circuit device configured to realize the functions thereof or may be configured by using a computation device such as a microcomputer or a CPU and software run by the computation device. Alternatively, the discharge superheat degree calculating unit 41 (141) may be configured as one of the functions of the controller 100.

Next, a functional configuration of the controller 100 will be explained. As a unit exercising the refrigerant equalization control, the controller 100 is configured to correct the imbalance of the liquid volumes by regulating the opening degree of the outdoor side expansion device 9 (109). The refrigerant equalization control will be explained in detail later.

Operation modes implemented by the air-conditioning apparatus 500 of Embodiment 1 include the cooling operation and the heating operation. Further, the cooling operation includes a cooling only operation (which is, in the present example, an operation in which all of the indoor units engaged in the air-conditioning process are cooling) and the cooling main operation (one of the simultaneous cooling/heating operations in which the cooling load is larger). Also, the heating operation includes a heating only operation (which is, in the present example, an operation in which all of the indoor units engaged in the air-conditioning process are heating) and the heating main operation (one of the simultaneous cooling/heating operations in which the heating load is larger).

Next, the relay device 200 of Embodiment 1 will be explained. A gas-liquid separator 201 included in the relay device 200 is configured to separate the refrigerant flowing therein from the high pressure pipe 402 into gas refrigerant and liquid refrigerant. A gas pipe 213 from which the gas refrigerant flows out is connected to branched-flow side open/close valves 202 (202a and 202b) configured by using solenoid valves.

The branched-flow side open/close valves 202 (202a and 202b) and branched-flow side open/close valves 203 (203a and 203b) each open and close in accordance with the operation mode. One end of each of the branched-flow side open/close valves 202 (202a and 202b) is connected to the gas-liquid separator 201, whereas the other ends thereof are each connected to the corresponding one of the gas pipes 403 (403a and 403b). Further, one end of each of the branched-flow side open/close valves 203 (203a and 203b) is connected to the corresponding one of the gas pipes 403 (403a and 403b), whereas the other ends thereof are connected to the low pressure pipe 401. By combining the branched-flow side open/close valves 202 (202a and 202b) with the branched-flow side open/close valves 203 (203a and 203b) and switching among these valves as appropriate, the refrigerant is caused to flow in one of the following two directions in accordance with the operation mode: a direction from the indoor units 300 side to the low pressure pipe 401 side; and another direction from the gas-liquid separator 201 side to the indoor units 300 side. In the present embodiment, the flow of the refrigerant is switched by using the branched-flow side open/close valves 202 and the branched-flow side open/close valves 203; however, it is also acceptable to use a three-way valve or a similar device, for example.

Further, the liquid pipe 212 from which the liquid refrigerant flows out is connected to first check valves 210 (210a and 210b). On the paths to reach the first check valves 210 (210a and 210b), the liquid pipe 212 is provided with an inter-refrigerant heat exchanger 206, a liquid-exit side flow control valve 204, and an inter-refrigerant heat exchanger 207. Further, the liquid pipe 212 has a bypass pipe 209 branching off from a position between the inter-refrigerant heat exchanger 207 and the first check valves 210 (210a and 210b). The bypass pipe 209 is connected to the low pressure pipe 401, via a bypass flow control valve 205, the inter-refrigerant heat exchanger 207, and the inter-refrigerant heat exchanger 206.

The liquid-exit side flow control valve 204 is provided between the inter-refrigerant heat exchanger 206 and the inter-refrigerant heat exchanger 207. The opening degree of the liquid-exit side flow control valve 204 is controlled in accordance with the operation mode, to regulate the refrigerant flow volume and the refrigerant pressure of the refrigerant flowing out from the gas-liquid separator 201.

One end of each of the first check valves 210 (210a and 210b) is connected to the liquid pipe 212, whereas the other ends thereof are each connected to the corresponding one of the liquid pipes 404 (404a and 404b). The first check valves 210 (210a and 210b) are configured to arrange the circulation path of the refrigerant to be in one direction regardless of the operation mode, by rectifying the flow of the refrigerant by preventing the refrigerant flowing from flowing backward. The first check valves 210 (210a and 210b) are configured to allow the refrigerant to flow from the high-pressure side to the low-pressure side in accordance with the operation mode. While the indoor units 300 are performing the cooling operation, the first check valves 210 (210a and 210b) are configured to allow the refrigerant to flow from the liquid pipe 212 to the liquid pipes 404 (404a and 404b), i.e., to the indoor units 300 side.

Further, each of the liquid pipes 404 (404a and 404b) is connected to one end of the corresponding one of second check valves 211 (211a and 211b). The other ends of the second check valves 211 are connected to a pipe 214. The pipe 214 extends from the second check valves 211 (211a and 211b) to be connected to a position between the liquid-exit side flow control valve 204 and the inter-refrigerant heat exchanger 207 provided in the liquid pipe 212. The second check valves 211 (211a and 211b) are configured to allow the refrigerant to flow from the high-pressure side to the low-pressure side in accordance with the operation mode. While the indoor units 300 are performing the heating operation, the second check valves 211 (211a and 211b) are configured to allow the refrigerant to flow from the liquid pipes 404 (404a and 404b) to the pipe 214. In other words, the refrigerant flowing from the indoor units 300 flows into the liquid pipe 212.

The bypass flow control valve 205 provided for the bypass pipe 209 branching off from the liquid pipe 212 is configured to regulate the refrigerant flow volume and the refrigerant pressure of the refrigerant flowing out from the inter-refrigerant heat exchanger 207. As for the refrigerant having passed through the bypass flow control valve 205, the refrigerant is subcooled in the inter-refrigerant heat exchanger 207 and the inter-refrigerant heat exchanger 206, for example, and flows into the low pressure pipe 401.

The inter-refrigerant heat exchanger 207 has a high-pressure side flow path and a low-pressure side flow path and is configured to exchange heat between the refrigerant passing through the high-pressure side flow path and the refrigerant passing through the low-pressure side flow path. Through the high-pressure side flow path, the refrigerant flowing from the liquid-exit side flow control valve 204 and the refrigerant flowing from the liquid pipes 404a and 404b pass. Through the low-pressure side flow path, the refrigerant in the downstream part of the bypass flow control valve 205 (the refrigerant having passed through the bypass flow control valve 205) passes. Also, the inter-refrigerant heat exchanger 206 similarly has a high-pressure side flow path and a low-pressure side flow path and is configured to exchange heat between the refrigerant passing through the high-pressure side flow path and the refrigerant passing through the low-pressure side flow path. Through the high-pressure side flow path of the inter-refrigerant heat exchanger 206, the liquid refrigerant flowing from the gas-liquid separator 201 toward the liquid-exit side flow control valve 204 passes. Through the low-pressure side flow path of the inter-refrigerant heat exchanger 206, the refrigerant having passed through the low-pressure side flow path of the inter-refrigerant heat exchanger 207 passes. In other words, the high-pressure side flow paths of the inter-refrigerant heat exchanger 206 and the inter-refrigerant heat exchanger 207 are represented by the liquid pipe 212. The low-pressure side flow paths of the same are represented by the bypass pipe 209. In the bypass pipe 209, a relay device temperature detecting unit 208 is installed before the bypass pipe 209 joins the low pressure pipe 401.

Next, a configuration of the indoor units 300 (300a and 300b) will be explained. Each of the indoor units 300 includes an indoor heat exchanger 301 (301a, 301b) and an indoor side expansion device 302 (302a, 302b) positioned proximate to and connected in series to the indoor heat exchanger 301. The indoor heat exchangers 301 serve as evaporators during the cooling operation and serve as condensers during the heating operation, to exchange heat between the air in the air-conditioned space and the refrigerant. In this situation, it is also acceptable to provide a fan in the vicinity of the each indoor heat exchangers 301 for the purpose efficiently exchanging the heat between the refrigerant and the air. Further, although the two indoor units 300 are provided in Embodiment 1, it is also acceptable to connect three or more indoor units 300 in parallel to the relay device.

Each of the indoor side expansion device 302 functions as a pressure reducing valve or an expansion valve and is configured to regulate the pressure of the refrigerant passing through the corresponding indoor heat exchanger 301. In this situation, let us assume that each of the indoor side expansion devices 302 of Embodiment 1 is configured by using, for example, an electronic expansion valve or a similar device of which the opening degree is variable. Further, the opening degree of each of the indoor side expansion devices 302 is determined based on the degree of superheat on the refrigerant exit side (the gas pipe 403 side in the present example) of the corresponding indoor heat exchangers 301, during the cooling operation. In contrast, the opening degree of each of the indoor side expansion devices 302 is determined based on the degree of subcooling on the refrigerant exit side (the liquid pipe 404 side in the present example) of the corresponding indoor heat exchanger 301, during the heating operation.

The air-conditioning apparatus 500 of Embodiment 1 configured as described above is capable of performing, as described above, any of the four modes, namely, the cooling only operation, the heating only operation, the cooling main operation, and the heating main operation. In Embodiment 1, the refrigerant equalization control and the prevention of the degradation of the cooling capacity of the indoor unit 300b functioning as a cooler during the heating main operation will be explained. Accordingly, the flow of the refrigerant during the heating main operation will be explained.

Figure 2:
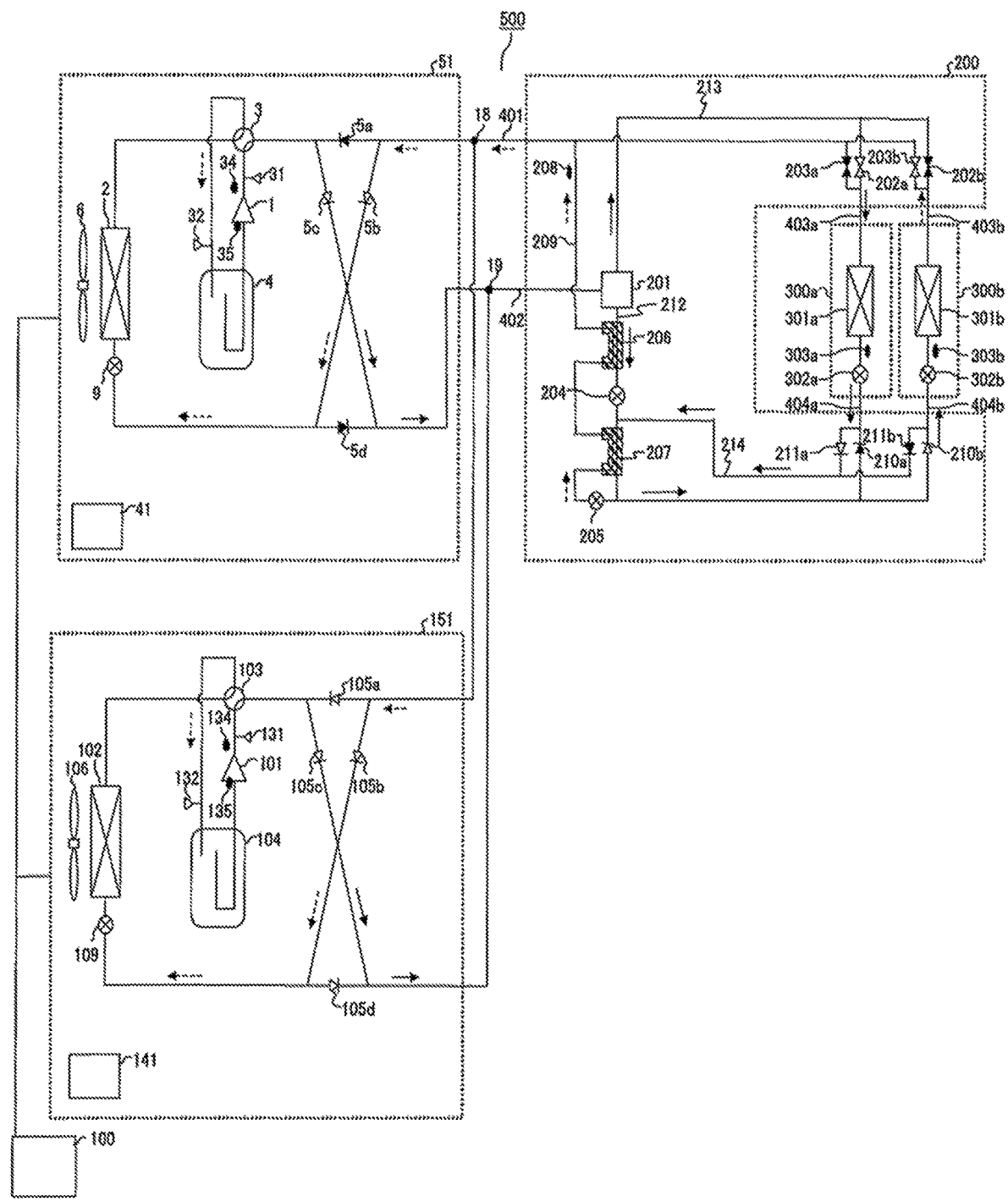
FIG. 2 is a diagram showing a flow of the refrigerant during a heating main operation of the air-conditioning apparatus according to Embodiment 1 of the present invention.

FIG. 2 is a diagram showing the flow of the refrigerant during the heating main operation of the air-conditioning apparatus 500 according to Embodiment 1 of the present invention. In the following sections, operations of certain devices and the flow of the refrigerant during the heating main operation will be explained with reference to FIG. 2. In the present example, a situation in which the indoor unit 300a is heating, while the indoor unit 300b is cooling will be explained. The flow of the refrigerant during the heating main operation is indicated with solid-line arrows and broken-line arrows in FIG. 2. The solid-line arrows indicate the flow of the high pressure refrigerant, whereas the broken-line arrows indicate the flow of the low pressure refrigerant. In the heat source apparatus 51 (151), the compressor 1 (101) compresses the suctioned refrigerant and discharges high pressure gas refrigerant. The refrigerant discharged by the compressor 1 (101) flows through the four-way valve 3 (103) and the check valve 5c (105c) (does not flow toward the check valve 5a (105a) or the check valve 5d (105d) because of the pressure of the refrigerant) and further passes through the high pressure pipe 402, before flowing into the relay device 200.

The refrigerant having flowed into the relay device 200 is separated by the gas-liquid separator 201 into the refrigerant in the gas state and the refrigerant in the liquid state. The refrigerant in the gas state flowing out from the gas-exit side of the gas-liquid separator 201 passes through the gas pipes 403 (403a and 403b) and flows into the indoor units 300 (300a and 300b). In the relay device 200, during the heating main operation, the branched-flow side open/close valve 202 (202a or 202b) connected to the indoor unit 300 performing the heating operation is open, whereas the branched-flow side open/close valve 203 (203a or 203b) connected to the indoor unit 300 performing the heating operation is closed. On the contrary, the branched-flow side open/close valve 202 (202a or 202b) connected to the indoor unit 300 performing the cooling operation is closed, whereas the branched-flow side open/close valve 203 (203a or 203b) connected to the indoor unit 300 performing the cooling operation is open.

In Embodiment 1, being connected to the indoor unit 300a functioning as a heater, the branched-flow side open/close valve 202a is open, while the branched-flow side open/close valve 203a is closed. In contrast, being connected to the indoor unit 300b functioning as a cooler, the branched-flow side open/close valve 202b is closed, while the branched-flow side open/close valve 203b is open. The refrigerant in the gas state passes through the gas pipe 403a and flows into the indoor unit 300a. As for the refrigerant having flowed into the indoor unit 300a, heat thereof is exchanged with the indoor air by the indoor heat exchanger 301a, to be condensed and liquified. At that time, the indoor air is heated, so that the inside of the room in which the indoor unit 300a is installed is heated. Further, the refrigerant having been condensed and liquified passes through the indoor side flow control valve 302a controlled according to the amount of subcooling on the exit side of the indoor heat exchanger 301a and transitions into a liquid state having intermediate pressure which is a level between high pressure and low pressure. The refrigerant in the liquid state having the intermediate pressure level passes through the liquid pipe 404a, the second check valve 211a, and the pipe 214 and flows into the liquid pipe 212, to join the liquid refrigerant flowing from the gas-liquid separator 201, before flowing into the inter-refrigerant heat exchanger 207.

After that, the refrigerant flows into the bypass pipe 209 branching off from the liquid pipe 212 extending toward the indoor units 300, and the pressure thereof is reduced by the bypass flow control valve 205 to low pressure. Further, the refrigerant is evaporated as a result of the heat thereof being exchanged with the refrigerant having passed through the liquid-exit side flow control valve 204 in the inter-refrigerant heat exchanger 207 (i.e., the refrigerant that is going to be branched off to the bypass pipe 209). Further, the refrigerant is evaporated as a result of the heat thereof being exchanged with the refrigerant that is going to flow into the liquid-exit side flow control valve 204 in the inter-refrigerant heat exchanger 206. The evaporated refrigerant flows into the low pressure pipe 401.

The refrigerant in the liquid state flowing out from the liquid-exit side of the gas-liquid separator 201 enters the liquid pipe 212 and passes through the inter-refrigerant heat exchanger 206, the liquid-exit side flow control valve 204, and the inter-refrigerant heat exchanger 207 provided in the liquid pipe 212, before flowing into the indoor units 300 (300a and 300b) through the liquid pipes 404 (404a and 404b). In Embodiment 1, the refrigerant passes through the first check valve 210b and flows into the indoor unit 300b functioning as a cooler. Further, the pressure of the refrigerant having flowed into the indoor unit 300b is reduced to low pressure by the indoor side expansion device 302b controlled according to the amount of superheat on the exit side of the indoor heat exchanger 301b. The refrigerant of which the pressure has been reduced flows into the indoor heat exchanger 301b and is evaporated and gasified as a result of the heat thereof being exchanged with the indoor air by the indoor heat exchanger 301b. At that time, the indoor air is cooled, so that the inside of the room in which the indoor unit 300b is installed is cooled. Further, the refrigerant in the gas state passes through the gas pipe 403a and the branched-flow side open/close valve 203b at a first branching part 240, before flowing into the low pressure pipe 401.

The refrigerant having flowed into the low pressure pipe 401 through the bypass pipe 209 and the indoor unit 300b flows into the heat source apparatus 51 (151), passes through the check valve 5b (105b) of the heat source apparatus 51 (151), and further passes through the outdoor side expansion device 9 (109). The refrigerant of which the flow volume has been regulated by regulating the opening degree of the outdoor side expansion device 9 (109) flows into the heat source side heat exchanger 2 (102). While passing through the heat source side heat exchanger 2 (102), the refrigerant is evaporated becomes gas refrigerant as a result of the heat thereof being exchanged with the air. After that, the refrigerant passes through the four-way valve 3 (103) and the accumulator 4 (104), returns to the compressor 1 (101) and is discharged. The circulation path of the refrigerant during the heating main operation has thus been explained.

In air-conditioning apparatuses including multiple heat source apparatuses such as the air-conditioning apparatus 500 according to Embodiment 1, refrigerant may be unevenly distributed among the heat source apparatuses due to various causes. Further, there is a correlation between the imbalance of the refrigerant and the degree of superheat of the suction and the degree of superheat of the discharge of the compressors 1 (101). In other words, when the volume of the refrigerant in a heat source apparatus decreases, the degree of superheat of the suction and the degree of superheat of the discharge of the compressor 1 (101) increase. On the contrary, when the volume of the refrigerant in a heat source apparatus increases, the degree of superheat of the suction and the degree of superheat of the discharge of the compressor 1 (101) decrease.

When the refrigerant is evenly distributed between the heat source apparatus 51 and the heat source apparatus 151, ideally, a relationship is satisfied where the degree of superheat of the discharge TdSHa from the compressor 1 is equal to the degree of superheat of the discharge TdSHb from the compressor 101. On the contrary, when there is a difference between the volume of the refrigerant held in the heat source apparatus 51 and the volume of the refrigerant held in the heat source apparatus 151, there is also a difference between the degree of superheat of the discharge TdSHa from the compressor 1 and the degree of superheat of the discharge TdSHb from the compressor 101 in accordance with the volume of the refrigerant held in the heat source apparatus 51. For example, when the volume of the refrigerant held in the heat source apparatus 151 is smaller than the volume of the refrigerant held in the heat source apparatus 51, TdSHa<TdSHb is satisfied.

The refrigerant equalization control is exercised by regulating the opening degree of the outdoor side expansion device 9 (109) installed in the heat source apparatus 51 (151). Each of the outdoor side expansion device 9 (109) functions as a pressure reducing valve or an expansion valve and is configured to regulate the flow of the refrigerant passing through the corresponding heat source apparatuses. However, when the outdoor side expansion device 9 (109) is narrowed excessively, the evaporating temperature of the indoor heat exchanger 301b of the indoor unit 300b functioning as a cooler rises, and the cooling capacity of the indoor unit 300b is therefore degraded. On the contrary, when the outdoor side expansion device 9 (109) is opened excessively, the temperature of the indoor heat exchanger 301b of the indoor unit 300b functioning as a cooler falls, and may be frozen in some situations. More specifically, when the temperature detected by the indoor unit temperature detecting unit 303b of the indoor unit 300b functioning as a cooler is equal to or lower than 0 degrees C., the indoor heat exchanger 301b may be frozen in some situations. Further, the indoor unit temperature detecting units 303 are configured by using a temperature sensor such as a thermistor.

To cope with this situation, there is an idea to directly do the opening degree of the outdoor side expansion device 9 (109) based on the temperature detected by the indoor unit temperature detecting unit 303b. However, if there were a large number of indoor units 300, the controller 100 would need to monitor a large number of pieces of temperature information detected by the indoor unit temperature detecting units 303 of the indoor units 300, which would impose a load on the controller 100. Accordingly, in Embodiment 1, a temperature T5 of the relay device temperature detecting unit 208 provided in the bypass pipe 209 through which the low-pressure side two-phase gas-liquid refrigerant flows before joining the low pressure pipe 401 shall be used as a representative value of the evaporating temperature of the indoor unit 300 functioning as a cooler. The opening degree of the outdoor side expansion device 9 (109) is thus controlled based on the temperature T5. With this arrangement, the controller 100 is able to appropriately maintain the temperature of the refrigerant in all the indoor units 300 connected to the relay device 200 by using the temperature information from only the one location, i.e., the relay device temperature detecting unit 208. Further, the relay device temperature detecting unit 208 is configured by using a temperature sensor such as a thermistor.

In Embodiment 1, the opening degree of the outdoor side expansion device 9 (109) is controlled in the manner described below, to be able to prevent the indoor unit 300b functioning as a cooler from having the cooling capacity degraded and from being frozen, by maintaining the opening degree of the outdoor side expansion device 9 (109) to be in an appropriate range, while correcting the imbalance of the refrigerant among the heat source apparatuses.

<The Opening Degree Control Over the Outdoor Side Expansion Device 9 (109)>

Next, an outline of the control in Embodiment 1 will be explained.

To achieve an ideal state in which the refrigerant is branched in separate flows at a ratio conforming to the refrigerant discharge volumes from the compressor 1 and the compressor 101, a condition of the degree of superheat as presented below should be satisfied. In other words, the degree of superheat of the discharge TdSHa from the compressor 1 should be substantially equal to the degree of superheat of the discharge TdSHb from the compressor 101.

In Embodiment 1, as explained below, the control is exercised so that, more specifically, the degree of superheat of the discharge TdSHa from the compressor 1 and the degree of superheat of the discharge TdSHb from the compressor 101 are both converged to be a prescribed target value TdSHm. In this situation, the target value TdSHm may be a value set in advance or may be a value being variable in accordance with the values of the degree of superheat of the discharge TdSHa and the degree of superheat of the discharge TdSHb during the operation. As for the value being variable in accordance with the values of the degree of superheat of the discharge TdSHa and the degree of superheat of the discharge TdSHb during the operation, a degree of superheat of the discharge TdSHa or a degree of superheat of the discharge TdSHb observed at the time of detecting imbalance of the refrigerant may be used as the target value TdSHm. Alternatively, a value between the degree of superheat of the discharge TdSHa and the degree of superheat of the discharge TdSHb may be used as the target value TdSHm. The volumes of the refrigerant in the heat source apparatus 51 (151) is regulated by appropriately increasing or decreasing the opening degree LEV2a (LEV2b) of the outdoor side expansion device 9 (109) to satisfy the condition of the degree of superheat. More specifically, the control is exercised as described below.

Figure 3:
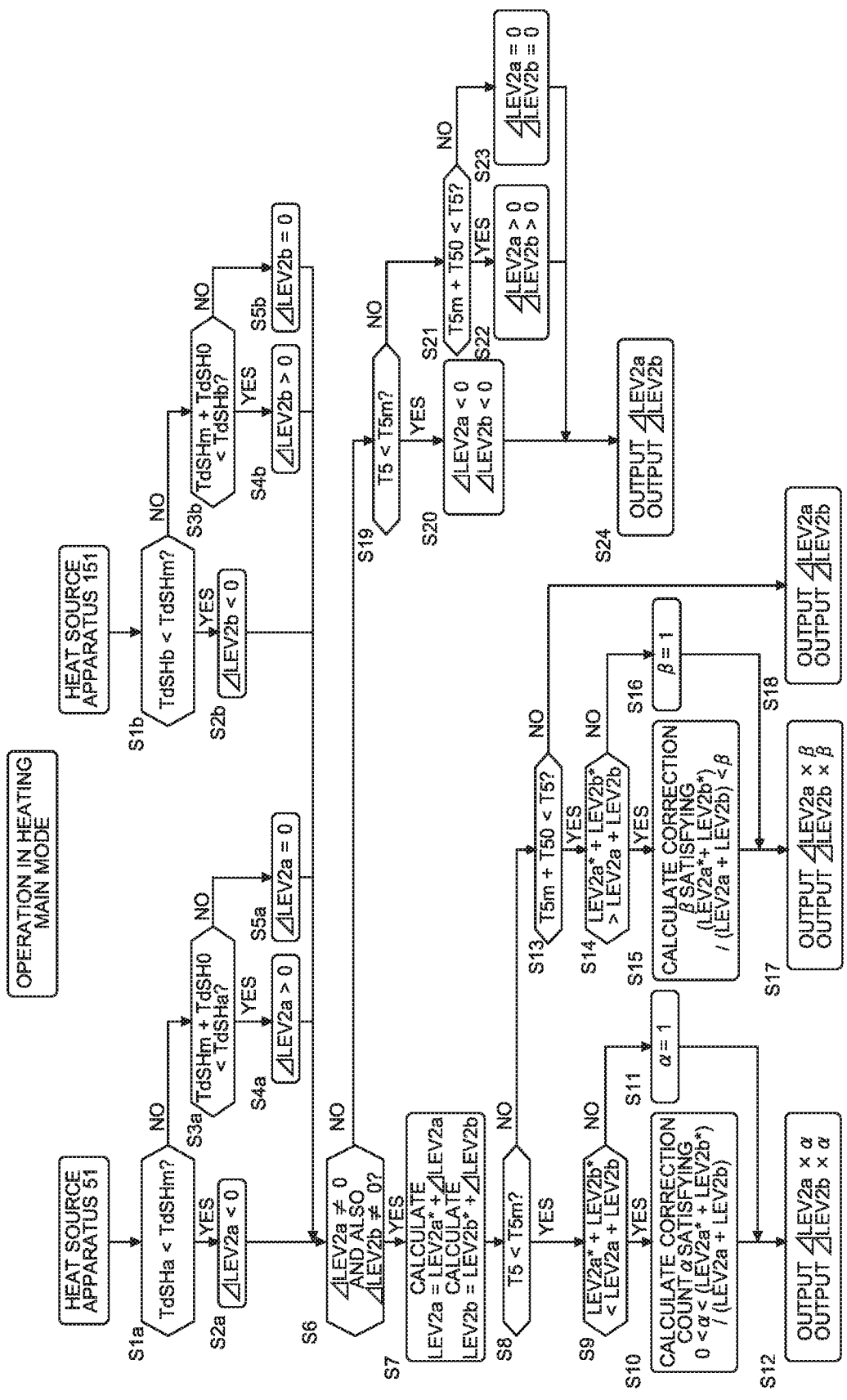
FIG. 3 is a control flowchart during the heating main operation of the air-conditioning apparatus according to Embodiment 1 of the present invention.

FIG. 3 is a control flowchart during the heating main operation of the air-conditioning apparatus 500 according to Embodiment 1 of the present invention.

The controller 100 judges whether or not the degree of superheat of the discharge TdSHa (TdSHb) from the compressor 1 (101) of the heat source apparatus 51 (151) is lower than the prescribed target value TdSHm for the degree of superheat of the discharge. In other words, the controller 100 judges whether or not the condition TdSHa<TdSHm (TdSHb<TdSHm) is satisfied (step S1a (step S1b)). In Embodiment 1, as for the degree of superheat of the discharge TdSHa (TdSHb), the discharge superheat degree calculating unit 41 (141) forwards a calculation result to the controller 100, so that the controller 100 performs the judging process by using the calculation result and the target value TdSHm.

When the degree of superheat of the discharge TdSHa (TdSHb) from the compressor 1 (151) is lower than the prescribed target value TdSHm for the degree of superheat of the discharge, it is determined that the volume of the refrigerant in the heat source apparatus 51 (151) is too large. The controller 100 determines that the opening degree LEV2a (LEV2b) of the outdoor side expansion device 9 (109) is to be decreased. In other words, the controller 100 establishes a setting to satisfy: The opening degree change amount $\Delta LEV2a<0$ ($\Delta LEV2b<0$) (step S2a (step S2b)).

In step S1, when the degree of superheat of the discharge TdSHa (TdSHb) is determined to be higher than the prescribed target value TdSHm for the degree of superheat of the discharge, the controller 100 further judges whether or not the condition TdSHa>TdSHm+TdSH0 (TdSHb>TdSHm+TdSH0) is satisfied (step S3a (step S3b)). The value TdSH0 is a tolerance value with respect to the target value. The tolerance value TdSH0 may be set as appropriate in accordance with the specification of the air-conditioning apparatus 500.

When the degree of superheat of the discharge TdSHa (TdSHb) is determined to be higher than a value obtained by adding the prescribed tolerance value TdSH0 to the target value TdSHm for the degree of superheat of the discharge, it is determined that the volume of the refrigerant in the heat source apparatus 51 (151) is too small. The controller 100 determines that the opening degree LEV2a (LEV2b) of the outdoor side expansion device 9 (109) to be increased. In other words, the controller 100 establishes a setting to satisfy: The opening degree change amount $\Delta LEV2a>0$ ($\Delta LEV2b>0$) (step S4a (step S4b)).

When the degree of superheat of the discharge TdSHa (TdSHb) is determined to be higher than the target value TdSHm for the degree of superheat of the discharge, but the exceeding amount is equal to or smaller than the prescribed tolerance value TdSH0, it is determined that the volume of the refrigerant in the heat source apparatus 51 (151) is appropriate. The controller 100 determines to maintain the opening degree LEV2a (LEV2b) of the outdoor side expansion device 9 (109). In other words, the controller 100 establishes a setting to satisfy: The opening degree change amount $\Delta LEV2a=0$ ($\Delta LEV2b=0$) (step S5a (step S5b)).

In this situation, the processes in steps S1b through S5b are performed also for the heat source apparatus 151 in parallel. When the controller 100 has established the settings for the opening degree change amount $\Delta LEV2a$ and the opening degree change amount $\Delta LEV2b$, the controller 100 judges whether neither of the opening degree change amount $\Delta LEV2a$ nor the opening degree change amount $\Delta LEV2b$ is 0 (step S6).

In step S6, when neither the opening degree change amount $\Delta LEV2a$ nor the opening degree change amount $\Delta LEV2b$ is 0, the controller 100 calculates the opening degree LEV2a (LEV2b) of the outdoor side expansion device 9 (109) observed after the opening degree is changed. In other words, the controller 100 calculates LEV2a=LEV2a*+/LEV2a (LEV2b=LEV2b*+L\LEV2b), where the opening degree LEV2a* (LEV2b*) denotes the opening degree of the outdoor side expansion device 9 (109) before changing the opening degree (step S7).

Subsequently, the temperature T5 of the refrigerant flowing through the bypass pipe 209 of the relay device 200 is checked. The controller 100 judges whether or not the temperature T5 is lower than a target value T5m. The controller 100 obtains the temperature T5 from the relay device temperature detecting unit 208 and judges whether or not the obtained temperature T5 is lower than the target value T5m (step S8).

When the temperature T5 of the refrigerant obtained by the relay device temperature detecting unit 208 is lower than the target value T5m, a sum of the opening degree LEV2a* of the outdoor side expansion device 9 before changing the opening degree and the opening degree LEV2b* of the outdoor side expansion device 109 before changing the opening degree is compared with a sum of the opening degree LEV2a of the outdoor side expansion device 9 after changing the opening degree and the opening degree LEV2b of the outdoor side expansion device 109 after changing the opening degree. In other words, the controller 100 judges whether or not the condition LEV2a*+LEV2b*<LEV2a+LEV2b is satisfied (step S9).

In step S9, when the condition LEV2a*+LEV2b*<LEV2a+LEV2b is satisfied, the controller 100 determines a correction coefficient $\alpha$ satisfying $0<\alpha<$ (LEV2a*+LEV2b*)/(LEV2a+LEV2b) (step S10). The correction coefficient $\alpha$ is to be multiplied by the opening degree change amount $\Delta LEV2a$ and the opening degree change amount $\Delta LEV2b$. In the situation where the temperature T5 of the refrigerant obtained by the relay device temperature detecting unit 208 is lower than the target value T5m, when the sum (LEV2a*+LEV2b*) of the opening degrees of the outdoor side expansion device 9 and the outdoor side expansion device 109 before changing the opening degrees is smaller than the sum (LEV2a+LEV2b) of the opening degrees after changing the opening degrees, the correction coefficient $\alpha$ is determined so that the sum (LEV2a+LEV2b) of the opening degrees of the outdoor side expansion device 9 and the outdoor side expansion device 109 after changing the opening degrees is the smaller of the two sums. In this situation, the correction coefficient $\alpha$ is a mathematical function of T5-T5m. The larger the absolute value (|T5m-T5|) of the difference between the temperature T5 and the target value T5m is, the smaller is the value of $\alpha$.

On the contrary, in step S9, when the condition LEV2a*+LEV2b*<LEV2a+LEV2b is not satisfied, the controller 100 determines the correction coefficient $\alpha$ to satisfy $\alpha=1$ (step S11).

When the correction coefficient $\alpha$ has been determined, the controller 100 exercises control to change the opening degree of the outdoor side expansion device 9 to satisfy LEV2a=LEV2a*+$\Delta LEV2a \times \alpha$. Also, the controller 100 exercises control to change the opening degree of the outdoor side expansion device 109 to satisfy $LEV2b=LEV2b^*+\Delta LEV2b\times\alpha$ (step S12).

In steps S9 through S12, the control is exercised so that the sum $LEV2a+LEV2b$ of the opening degree of the outdoor side expansion device 9 and the opening degree of the outdoor side expansion device 109 is as close as possible to the sum of the opening degrees before the change. The temperature T5 is the temperature of the two-phase gas-liquid refrigerant flowing through the bypass pipe 209. However, the temperature of the refrigerant flowing through the pipe having installed the indoor unit temperature detecting unit 303b positioned on the upstream side of the bypass pipe 209 in terms of the refrigerant flow is higher than the temperature T5. Accordingly, for example, by setting the target value T5m to be a temperature above the freezing point (e.g., 1 degree C.), it is also possible to control the temperature of the refrigerant flowing through the pipe having installed the indoor unit temperature detecting unit 303b to be higher than 1 degree C. In this situation, in step S12, the opening degree change amount $\Delta LEV2a$ and the opening degree change amount $\Delta LEV2b$ are each an amount set in accordance with the imbalance in the volumes of the refrigerant between the heat source apparatus 51 and the heat source apparatus 151. Further, while ensuring not to change the ratio between the opening degree change amount $\Delta LEV2a$ and the opening degree change amount $\Delta LEV2b$, the sum $LEV2a+LEV2b$ of the opening degree of the outdoor side expansion device 9 and the opening degree of the outdoor side expansion device 109 is changed. As a result, the controller 100 is able to prevent the indoor unit 300b functioning as a cooler from being frozen, while appropriately performing the refrigerant equalization control.

In step S8, when the temperature T5 of the bypass pipe 209 is equal to or higher than the target value T5m, the controller 100 judges whether or not the condition $T5>T5m+T50$ is satisfied (step S13), In this situation, T50 is a tolerance value for the measured temperature.

When the temperature T5 of the refrigerant obtained by the relay device temperature detecting unit 208 is higher than the value obtained by adding the tolerance value T50 to the target value T5m, a sum of the opening degree $LEV2a^*$ of the outdoor side expansion device 9 before changing the opening degree and the opening degree $LEV2b^*$ of the outdoor side expansion device 109 before changing the opening degree is compared with a sum of the opening degree $LEV2a$ of the outdoor side expansion device 9 after changing the opening degree and the opening degree $LEV2b$ of the outdoor side expansion device 109 after changing the opening degree. In other words, the controller 100 judges whether or not the condition $LEV2a^*+LEV2b^*>LEV2a+LEV2b$ is satisfied (step S14).

In step S14, when the condition $LEV2a^*+LEV2b^*>LEV2a+LEV2b$ is determined to be satisfied, the controller 100 determines a correction coefficient β satisfying $\beta>(LEV2a^*+LEV2b^*)$ $(LEV2a+LEV2b)$ (step S15). The correction coefficient α is to be multiplied by the opening degree change amount $\Delta LEV2a$ and the opening degree change amount $\Delta LEV2b$. In the situation where the temperature T5 of the refrigerant obtained by the relay device temperature detecting unit 208 is higher than the target value T5m, when the sum of the opening degrees of the outdoor side expansion device 9 and the outdoor side expansion device 109 before changing the opening degrees is larger than the sum of the opening degrees after changing the opening degrees, the correction coefficient 1 is determined so that the sum $(LEV2a+LEV2b)$ of the opening degrees of the outdoor side expansion device 9 and the outdoor side expansion device 109 after changing the opening degrees is the larger of the two sums. In this situation, the correction coefficient β is a mathematical function of $T5-T5m$. The larger the absolute value ($|T5m-T5|$) of the difference between the temperature T5 and the target value T5m is, the larger is the value of β.

In step S14, when the condition $LEV2a^*+LEV2b^*>LEV2a+LEV2b$ is determined to be satisfied, the controller 100 determines the correction coefficient β to satisfy $\beta=1$ (step S16).

When the correction coefficient β has been determined, the controller 100 exercises control to change the opening degree of the outdoor side expansion device 9 to satisfy $LEV2a=LEV2a^*+\Delta LEV2a\times\beta$. Also, the controller 100 exercises control to change the opening degree of the outdoor side expansion device 109 to satisfy $LEV2b=LEV2b^*+\Delta LEV2b\times\alpha$ (step S17).

In step S13, when the temperature T5 of the bypass pipe 209 is equal to or lower than $T5m+T50$, the controller 100 does not determine the correction coefficient β but exercises control to change the opening degree of the outdoor side expansion device 9 to satisfy: $LEV2a=LEV2a^*+\Delta LEV2a$. Also, the controller 100 exercises control to change the opening degree of the outdoor side expansion device 109 to satisfy: $LEV2b=LEV2b^*+\Delta LEV2b$ (step S18).

In step S6, when the opening degree change amount $\Delta LEV2a$ is not equal to the opening degree change amount $\Delta LEV2b$, or when the opening degree change amount $\Delta LEV2a$ and the opening degree change amount $\Delta LEV2b$ are equal to each other and are both 0, the controller 100 checks the temperature T5 of the refrigerant flowing through the bypass pipe 209 of the relay device 200. The controller 100 judges whether or not the temperature T5 is lower than the target value T5m. The controller 100 obtains the temperature T5 from the relay device temperature detecting unit 208 and judges whether or not the obtained temperature T5 is lower than the target value T5m (step S19).

In step S19, when $T5<T5m$ is satisfied, it is determined that the volume of the refrigerant in the heat source apparatus 51 (151) is too large, and the controller 100 determines that the opening degree $LEV2a$ ($LEV2b$) of the outdoor side expansion device 9 (109) is to be decreased. In other words, the controller 100 establishes a setting to satisfy: The opening degree change amount $\Delta LEV2a<0$ ($\Delta LEV2b<0$) (step S20).

In step S19, when the temperature T5 of the bypass pipe 209 is equal to or higher than the target value T5m, the controller 100 judges whether or not the condition $T5>T5m+T50$ is satisfied (step S21).

When the temperature T5 of the refrigerant obtained by the relay device temperature detecting unit 208 is higher than the target value T5m by the prescribed value T50, the controller 100 establishes a setting to satisfy: The opening degree change amount $\Delta LEV2a>0$ ($\Delta LEV2b>0$) (step S22).

When the temperature T5 of the refrigerant obtained by the relay device temperature detecting unit 208 does not satisfy the condition in step S21, i.e., when $T5m\leq T5\leq T5m+T50$ is satisfied, the controller 100 establishes a setting to satisfy: The opening degree change amount $\Delta LEV2a=0$ ($\Delta LEV2b=0$) (step S23).

After the processes in steps S19 through S23, when the controller 100 has established the settings for the opening degree change amount $\Delta LEV2a$ and the opening degree change amount $\Delta LEV2b$, the controller 100 exercises control to change the opening degree of the outdoor side expansion device 9 to satisfy $LEV2a=LEV2a^*+\Delta LEV2a$.

Also, the controller 100 exercises control to change the opening degree of the outdoor side expansion device 109 to satisfy LEV2b=LEV2b*+ΔLEV2b (step S24).

In any of steps S12, S17, S18, and S24, the controller 100 determines the opening degree LEV2a of the outdoor side expansion device 9 and the opening degree LEV2b of the outdoor side expansion device 109 and further exercises control to change the opening degrees of the outdoor side expansion devices 9 and 109. However, the outdoor side expansion device 9 and the outdoor side expansion device 109 may have different specifications from each other. In that situation, the outdoor side expansion device 9 and the outdoor side expansion device 109 may have mutually-different Cv values even when the opening degrees are equal to each other. In that situation, a correction shall be made with multiplication using a correction coefficient γ satisfying LEV2a=LEV2b×γ.

<Advantageous Effects of Embodiment 1>

(1) An air-conditioning apparatus according to Embodiment 1 of the present invention includes; a plurality of heat source apparatuses 51 (151) each including a compressor 1 (101), an outdoor side expansion device 9 (109), a heat source side heat exchanger 2 (102), and an accumulator 4 (104); a plurality of indoor units 300 each including an indoor heat exchanger 301 and each configured to perform one of cooling and heating operations; a relay device 200 connected to the heat source apparatuses 51 (151) by a high pressure pipe 402 and a low pressure pipe 401 and configured to distribute refrigerant flowing therein from the heat source apparatuses 51 (151) to the plurality of indoor units 300; and a controller 100 configured to control operations of the heat source apparatuses 51 (151). During a heating main operation in which at least one indoor unit 300b among the plurality of indoor units 300 performs the cooling operation, whereas a remaining indoor unit 300a performs the heating operation, the relay device 200 includes: a gas-liquid separator 201 configured to separate the refrigerant flowing from the high pressure pipe 402 into gas refrigerant in a gas state and liquid refrigerant in a liquid state; a gas pipe 213 configured to supply the gas refrigerant exiting the gas-liquid separator 201 to the indoor unit 300a performing the heating operation from among the plurality of indoor units 300; a liquid pipe 212 configured to supply the liquid refrigerant flowing from the gas-liquid separator 201 to the indoor unit 300b performing the cooling operation from among the plurality of indoor units 300; a bypass pipe 209 branching off from the liquid pipe 212 and connected to the low pressure pipe 401; a bypass flow control valve 205 configured to regulate a flow volume of the refrigerant flowing through the bypass pipe 209; and a relay device temperature detecting unit 208 configured to detect a temperature of the refrigerant flowing through the bypass pipe 209. The controller 100 changes the opening degree of each of the outdoor side expansion devices 9 (109) based on the temperature T5 detected by the relay device temperature detecting unit 208.

In this configuration; the temperature T5 denotes the temperature of the two-phase gas-liquid refrigerant flowing through the bypass pipe 209 and represents the evaporating temperature of the indoor heat exchanger 301b provided in the indoor unit 300b performing the cooling operation. Accordingly, as a result of setting the target value T5m to a non-freezing temperature, it is also possible to control the temperature of the refrigerant flowing through the pipe having installed the indoor unit temperature detecting unit 303b to be higher than the target value T5m. As a result, by controlling the opening degree of the outdoor side expansion device 9 (109) based on the temperature T5, it is possible to appropriately maintain the temperature inside the indoor unit 300b performing the cooling operation, because the temperature T5 is controlled to be in the appropriate range. Consequently, the controller 100 is able to prevent the indoor unit 300b functioning as a cooler from having the cooling capability degraded and from being frozen, while appropriately performing the refrigerant equalization control.

(2) In an air-conditioning apparatus according to Embodiment 1 of the present invention, the controller 100 sets an opening degree change amount ΔLEV2a (ΔLEV2b) of each of the outdoor side expansion devices 9 (109) based on degrees of superheat of discharges from the compressors 1 (101). The controller 100 determines a correction coefficient α or β, based on a ratio between a sum (LEV2a*LEV2b*) of the opening degrees LEV2a* (LEV2b*) of the outdoor side expansion devices 9 (109) of the heat source apparatuses 51 (151) and a sum of values (LEV2a+LEV2b) obtained by adding each of the opening degree change amounts ΔLEV2a (ΔLEV2b) to the respective opening degree LEV2a* (LEV2b*). The controller 100 changes the opening degree LEV2a (LEV2b) of each of the outdoor side expansion devices 9 (109) by a value obtained by multiplying the corresponding one of the opening degree change amounts ΔLEV2a (ΔLEV2b) by the correction coefficient α or β.

(3) Further, in an air-conditioning apparatus according to Embodiment 1 of the present invention, when the temperature T5 is lower than the target value T5m, while a sum (LEV2a+LEV2b) of the values obtained by adding each of the opening degree change amounts ΔLEV2a (ΔLEV2b) to the respective opening degree LEV2a* (LEV2b*) is larger than a sum (LEV2a*+LEV2b*) of the opening degrees LEV2a* (LEV2b*) of the outdoor side expansion devices 9 (109) of the plurality of heat source apparatuses 51 (151), the controller 100 determines a correction coefficient α satisfying the condition 0<α<(LEV2a*+LEV2b*)/(LEV2a+LEV2b). The controller 100 changes the opening degree LEV2a (LEV2b) of each of the outdoor side expansion devices 9 (109) by a value obtained by multiplying the corresponding one of the opening degree change amounts ΔLEV2a (ΔLEV2b) by the correction coefficient α.

(4) Further, in an air-conditioning apparatus according to Embodiment 1 of the present invention, when the temperature T5 is higher than the target value T5m, while a sum (LEV2a+LEV2b) of the values obtained by adding each of the opening degree change amounts ΔLEV2a (ΔLEV2b) to the respective opening degree LEV2a* (LEV2b*) is smaller than a sum (LEV2a*+LEV2b*) of the opening degrees LEV2a* (LEV2b*) of the outdoor side expansion devices 9 (109) of the plurality of heat source apparatuses 51 (151), the controller 100 determines a correction coefficient β satisfying a condition (LEV2a+LEV2b)/(LEV2a*+LEV2b*)<β. The controller 100 changes the opening degree LEV2a (LEV2b) of each of the outdoor side expansion devices 9 (109) by a value obtained by multiplying the corresponding one of the opening degree change amounts ΔLEV2a (ΔLEV2b) by the correction coefficient β.

With these configurations, regardless of the presence/absence of imbalance of the refrigerant between the heat source apparatus 51 and the heat source apparatus 151, it is possible to increase or decrease the sum LEV2a LEV2b of the opening degrees, while maintaining the ratio between the opening degree change amounts ΔLEV2a (ΔLEV2b) between the outdoor side expansion device 9 and the outdoor side expansion device 109. Consequently, it is possible to increase or decrease the sum of the opening degrees of the outdoor side expansion devices 9 (109), while realizing the refrigerant equalization control between the heat source apparatuses 51 (151). It is therefore possible to prevent the indoor unit 300b performing the cooling operation from having the cooling capacity degraded and from being frozen.

Embodiment 2

In contrast to Embodiment 1, in Embodiment 2, a temperature detected by the indoor unit temperature detecting unit 303 provided for each of the indoor units 300 is used in place of the temperature T5 of the bypass pipe 209 used for controlling the opening degrees of the outdoor side expansion devices 9 (109). As for the temperature used for the control, the controller 100 uses the lowest temperature among the temperatures detected by the indoor unit temperature detecting units 303 provided in the indoor units 300 functioning as coolers. In Embodiment 1, there is an impact made by a rise in the evaporating temperature of the indoor units 300 caused by pressure loss due to the pipe length from the indoor units to the relay device, it is necessary to exercise control while arranging the target value T5m for the temperature T5 to be lower. In contrast, in Embodiment 2, because the pipe temperature of the indoor unit 300 for which the prevention against freezing is intended is directly measured, it is possible to exercise control with a high level of precision.

<Advantageous Effects of Embodiment 2>

(5) An air-conditioning apparatus 500 according to Embodiment 2 of the present invention includes: a plurality of heat source apparatuses 51 (151) each including a compressor 1 (101), an outdoor side expansion device 9 (109), a heat source side heat exchanger 2 (102), and an accumulator 4 (104); a plurality of indoor units 300 each including an indoor heat exchanger 301 and each configured to perform one of cooling and heating operations; a relay device 200 connected to the heat source apparatuses 51 (151) by a high pressure pipe 402 and a low pressure pipe 401 and configured to distribute refrigerant flowing therein from the heat source apparatuses 51 (151) to the plurality of indoor units 300; and a controller 100 configured to control operations of the heat source apparatuses 51 (151), During a heating main operation in which at least one indoor unit 300b among the plurality of indoor units 300 performs the cooling operation, whereas the remaining indoor unit 300a performs the heating operation, the indoor unit 300b includes: an indoor unit temperature detecting unit 303b provided between the indoor heat exchanger 301 and the indoor side expansion device 302. The controller 100 changes an opening degree of each of the outdoor side expansion devices 9 (109) based on a temperature T5 detected by the indoor unit temperature detecting unit 303b.

In this configuration, the controller 100 is able to directly monitor and control the temperature T5 of the indoor unit 300b performing the cooling operation from among the indoor units 300. Accordingly, because of not being impacted by the pipe length, the air-conditioning apparatus 500 according to Embodiment 2 is able to exercise control with a higher level of precision than the air-conditioning apparatus 500 according to Embodiment 1.

Embodiment 3

Figure 4:
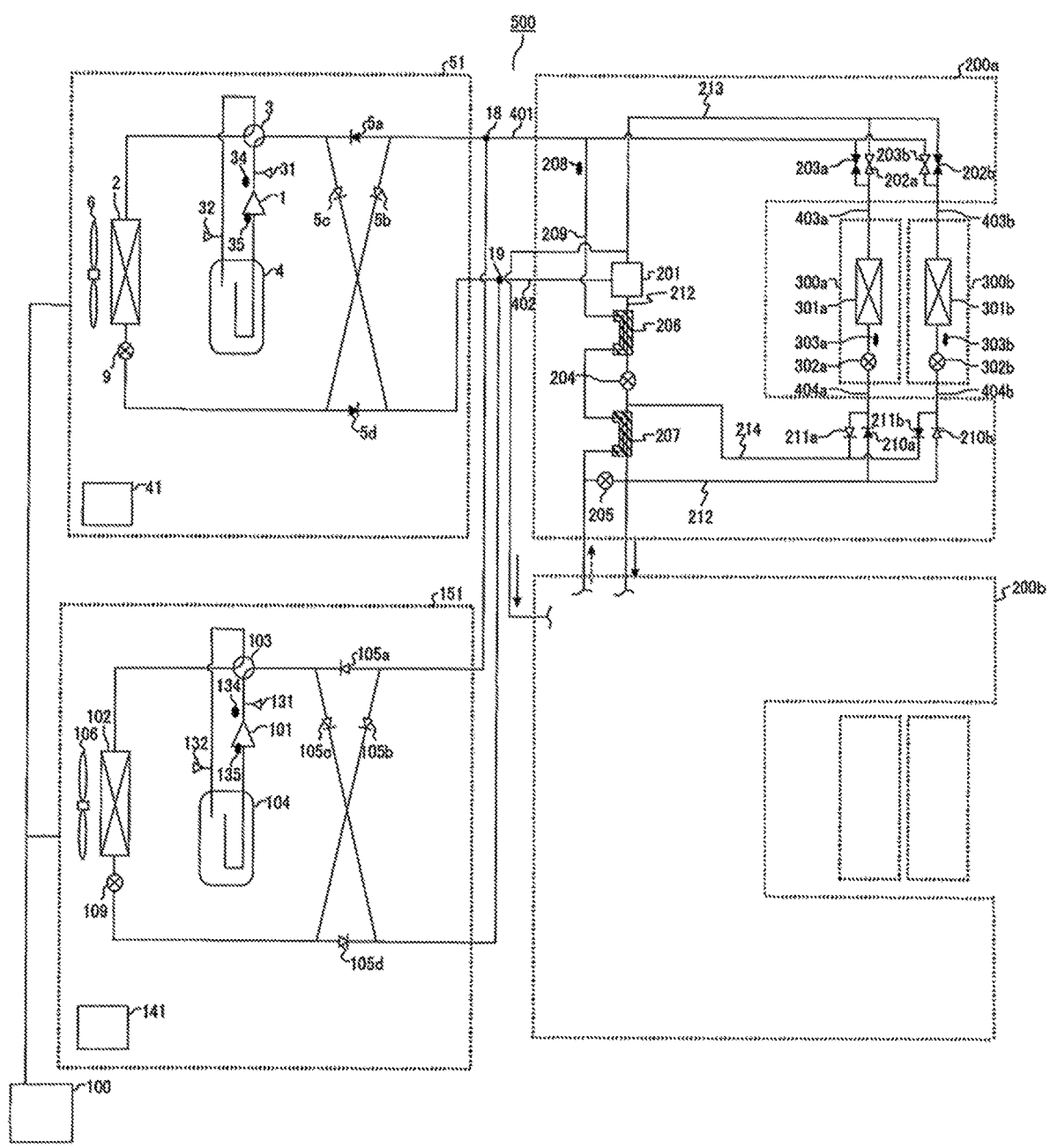
FIG. 4 is a diagram showing a flow of the refrigerant during a heating main operation of the air-conditioning apparatus according to Embodiment 3 of the present invention.

FIG. 4 is a diagram showing a flow of the refrigerant during the heating main operation of the air-conditioning apparatus 500 according to Embodiment 3 of the present invention. In contrast to Embodiment 1, the air-conditioning apparatus 500 according to Embodiment 3 of the present invention is provided with a plurality of relay devices 200. In the illustration of FIG. 4, the details of the circuits of the relay device 200b and the indoor units 300 are omitted.

In Embodiment 3, although the plurality of relay devices 200 are provided, the temperature T5 is detected by using the relay device temperature detecting unit 208 provided in the bypass pipe 209 positioned closest to the heat source apparatus 51 (151). Further, by exercising control in the same manner as shown in the flowchart in FIG. 3, it is possible to prevent the indoor heat exchanger 301 included in the indoor unit 300 from having the cooling capacity degraded due to a rise in the evaporating temperature and from being frozen due to a fall in the temperature of the indoor heat exchanger 301.

<Advantageous Effects of Embodiment 3>

(6) An air-conditioning apparatus 500 according to Embodiment 3 of the present invention includes two or more relay devices 200a. The controller 100 changes the opening degree of each of the outdoor side expansion devices 9 (109) based on the temperature T5 of one of the relay devices 200a positioned closest to the heat source apparatuses 51 (151).

With this configuration, as shown in FIG. 4, the relay device 200b is connected to the heat source apparatus 51 (151) via the relay device 200a. Accordingly, by detecting the temperature of the refrigerant by providing the relay device temperature detecting unit 208 in the bypass pipe 209 of the relay device 200a positioned closest to the outdoor side expansion device 9 (109), it is possible to lessen the impact of the pipe length.

Embodiment 4

In Embodiment 1, the controller 100 is configured to control the opening degrees of the outdoor side expansion devices 9 (109) by using the degrees of superheat of the discharge TdSH from the compressors 1 (101). In contrast, the air-conditioning apparatus 500 according to Embodiment 4 is configured to control the opening degrees of the outdoor side expansion devices 9 (109) by using degrees of superheat underneath the shell SHshell of the compressors 1 (101) in place of the degrees of superheat of the discharges TdSH.

The degrees of superheat underneath the shell SHshell are each calculated from a temperature Te1 (Te2) obtained by a compressor shell temperature detecting unit 35 (135) provided on the surface of the shell of the compressor in a location where the refrigerating machine oil of the compressor 1 (101) is accumulating; and suction pressure measured by the suction pressure detecting unit 32 (132) installed on the suction side of the compressor 1 (101).

$$SH\text{shell}a = T\text{shell}1 - Te1 \qquad (3)$$

$$SH\text{shell}b = T\text{shell}2 - Te2 \qquad (4)$$

where Tshell1 [degrees C.]: a saturation temperature calculated by performing a saturation conversion on the suction pressure detected by the suction pressure detecting unit 32; and Tshell2 [degrees C.]: a saturation temperature calculated by performing a saturation conversion on the suction pressure detected by the suction pressure detecting unit 132.

In Embodiment 4, the degrees of superheat underneath the shell SHshell are used in place of the TdSH values in the flowchart shown in FIG. 3, whereas a target value SHshellm for the degree of superheat underneath the shell is used in place of the target value TdSHm. Further, an opening degree change amount ΔLEV2a (ΔLEV2b) is set based on a relationship between the degrees of superheat underneath the shell SHshell and the target value SHshellm for the degrees of superheat underneath the shell.

<Advantageous Effects of Embodiment 4>

(7) In an air-conditioning apparatus 500 according to Embodiment 4 of the present invention, the controller 100 sets the opening degree change amounts ΔLEV2a (ΔLEV2b) of the outdoor side expansion devices 9 (109) based on the degree of superheat underneath the shell SHshella of the compressor 1 (101). The controller 100 determines the correction coefficient α or β based on the ratio between the sum (LEV2a*+LEV2b*) of the opening degrees LEV2a* (LEV2b*) of the outdoor side expansion devices 9 (109) of the plurality of heat source apparatuses 51 (151) and the sum (LEV2a+LEV2b) of the values obtained by adding each of the opening degree change amounts ΔLEV2a (ΔLEV2b) to the respective opening degree LEV2a* (LEV2b*). The controller 100 changes the opening degrees LEV2a (LEV2b) of the outdoor side expansion devices 9 (109) by using the value obtained by multiplying the opening degree change amounts ΔLEV2a (ΔLEV2b) by the correction coefficient α or β.

With this configuration, it is possible to more directly detect the suction state of the compressors 1 (101) than in the air-conditioning apparatus 500 according to Embodiment 1. Consequently, it is possible to protect the compressors 1 (101) by performing the refrigerant equalization process with a higher level of precision.

REFERENCE SIGNS LIST 1 compressor 2 heat source side heat exchanger 3 four-way valve 4 accumulator 5a check valve 5b check valve 5c check valve 5d check valve 9 outdoor side expansion valve 18 liquid side joint part 19 gas side joint part 31 discharge pressure detecting unit 32 suction pressure detecting unit 34 discharge temperature detecting unit 35 compressor shell temperature detecting unit 41 discharge superheat degree calculating unit 51 heat source apparatus 100 controller 101 compressor 104 accumulator 109 outdoor side expansion device 131 discharge pressure detecting unit 132 suction pressure detecting unit 141 discharge superheat degree calculating unit 151 heat source apparatus 200 relay device 200a relay device 200b relay device 201 gas-liquid separator 202 branched-flow side open/close valve 202a branched-flow side open/close valve 202b branched-flow side open/close valve 203 branched-flow side open/close valve 203a branched-flow side open/close valve 203b branched-flow side open/close valve 204 liquid-exit side flow control valve 205 bypass flow control valve 206 inter-refrigerant heat exchanger 207 inter-refrigerant heat exchanger 208 relay device temperature detecting unit 209 bypass pipe 210 first check valve 210b first check valve 211 second check valve 211a second check valve 212 liquid pipe 213 gas pipe 214 pipe 240 first branching part 300 indoor unit 300a indoor unit 300b indoor unit 301 indoor heat exchanger 301a indoor heat exchanger 301b indoor heat exchanger 302 indoor side expansion device 302a indoor side flow control valve 302b indoor side expansion valve 303 indoor unit temperature detecting unit 303b indoor unit temperature detecting unit 401 low pressure pipe 402 high pressure pipe 403 gas pipe 403a gas pipe 403b gas pipe 404 liquid pipe 404a liquid pipe 404b liquid pipe 500 air-conditioning apparatus LEV2a opening degree LEV2a* opening degree LEV2b opening degree LEV2b* opening degree T5 temperature T50 tolerance value T5m target value Td1 discharge temperature TdSH degree of superheat of the discharge TdSH0 tolerance value TdSHa degree of superheat of the discharge TdSHb degree of superheat of the discharge TdSHm target value Te1 temperature ΔLEV2a opening degree change amount ΔLEV2b opening degree change amount α correction coefficient β correction coefficient γ correction coefficient.

The invention claimed is:

1. An air-conditioning apparatus comprising:
a plurality of heat source apparatuses each including a compressor, an outdoor side expansion valve, a heat source side heat exchanger, and an accumulator;
a plurality of indoor units each including an indoor heat exchanger and each configured to perform one of a cooling operation and a heating operation;
a relay device connected to the heat source apparatuses by a high pressure pipe and a low pressure pipe and configured to distribute refrigerant flowing therein from the heat source apparatuses to the plurality of indoor units; and
a controller configured to control operations of the heat source apparatuses, wherein:
the relay device includes
a gas-liquid separator configured to separate the refrigerant flowing from the high pressure pipe into gas refrigerant in a gas state and liquid refrigerant in a liquid state;
a gas pipe configured to supply the gas refrigerant exiting the gas-liquid separator to any indoor unit performing the heating operation from among the plurality of indoor units during a heating main operation in which one or more of the plurality of indoor units perform the cooling operation, whereas remaining indoor units perform the heating operation;
a liquid pipe configured to supply the liquid refrigerant flowing from the gas-liquid separator to the one or more indoor units performing the cooling operation from among the plurality of indoor units during the heating main operation;
a bypass pipe branching off from the liquid pipe and connected to the low pressure pipe;
a bypass flow control valve configured to regulate a flow volume of the refrigerant flowing through the bypass pipe; and
a relay device temperature detecting sensor configured to detect a temperature of the refrigerant flowing through the bypass pipe,
the plurality of heat source apparatuses include a first heat source apparatus including a first outdoor expansion valve and a second heat source apparatus including a second outdoor expansion valve,
an opening degree of the first outdoor side expansion valve prior to change of the opening degree is LEV2a*,
an opening degree of the second outdoor side expansion valve prior to change of the opening degree is LEV2b*,
an opening degree of the first outdoor side expansion valve after a first opening degree change amount is added to LEV2a* is LEV2a,
an opening degree of the second outdoor side expansion valve after a second opening degree change amount is added to LEV2b* is LEV2b, during the heating main operation, the controller
sets an opening degree change amount of each of the outdoor side expansion valves based on a superheat degree of the compressor of each heat source apparatus, the superheat degree being calculated using a pressure and temperature of refrigerant detected by a pressure detecting sensor and a temperature detecting sensor, respectively, that are disposed on one of a discharge side and a suction of side of the compressor of each heat source apparatus, and
increases or decreases a sum of opening degrees of the outdoor side expansion valves of the plurality of heat source apparatuses by changing opening degrees of the outdoor expansion valves while maintaining a ratio between opening degree change amounts of the outdoor side expansion valves in response to the temperature detected by the relay device temperature detecting sensor, and
when a temperature T5 detected by the relay device temperature detecting sensor is lower than a target value T5$m$, while a sum (LEV2$a$+LEV2$b$) of the values obtained by adding each of the opening degree change amounts to the respective opening degree prior to change of the first and second outdoor side expansion valves of the heat source apparatuses is larger than a sum (LEV2$a$*+LEV2$b$*) of the opening degrees prior to change of the first and second outdoor side expansion valves of the heat source apparatuses,
the controller determines a correction coefficient $\alpha$ satisfying a condition 0<$\alpha$<(LEV2$a$*+LEV2$b$*)/(LEV2$a$+LEV2$b$), and
the controller changes the opening degree of the first and second outdoor side expansion valves by a value obtained by multiplying the corresponding one of the opening degree change amounts ($\Delta$LEV2$a$, $\Delta$LEV2$b$) by the correction coefficient $\alpha$.

2. The air-conditioning apparatus of claim 1, wherein the controller sets the opening degree change amount of each of the outdoor side expansion valves based on a discharge superheat degree of the compressor of each heat source apparatus, the discharge superheat degree being calculated using the pressure and the temperature of the refrigerant discharged from the compressor of each heat source apparatus, as detected by the refrigerant pressure detecting sensor and the refrigerant temperature detecting sensor that are disposed on the discharge side of the compressor of each heat source apparatus.

3. The air-conditioning apparatus of claim 1, wherein the controller sets the opening degree change amount of each of the outdoor side expansion valves based on a superheat degree underneath a shell of the compressor of each heat source apparatus, the superheat degree underneath the shell being calculated using the pressure and the temperature of the refrigerant suctioned into the compressor of each heat source apparatus, as detected by the refrigerant pressure detecting sensor and the refrigerant temperature detecting sensor that are disposed on the suction side of the compressor of each heat source apparatus.

4. The air-conditioning apparatus of claim 1, wherein the first or second heat source apparatuses consist of a plurality of heat source apparatuses.

5. An air-conditioning apparatus comprising:
a plurality of heat source apparatuses each including a compressor, an outdoor side expansion valve, a heat source side heat exchanger, and an accumulator;
a plurality of indoor units each including an indoor heat exchanger and an indoor side expansion valve and each configured to perform one of a cooling operation and a heating operation;
a relay device connected to the heat source apparatuses by a high pressure pipe and a low pressure pipe and configured to distribute refrigerant flowing therein from the heat source apparatuses to the plurality of indoor units; and
a controller configured to control operations of the heat source apparatuses, wherein:
each of the indoor units includes an indoor unit temperature detecting sensor provided between the indoor heat exchanger and the indoor side expansion valve and configured to detect a temperature of the indoor heat exchanger,
the plurality of heat source apparatuses include a first heat source apparatus including a first outdoor expansion valve and a second heat source apparatus including a second outdoor expansion valve,
an opening degree of the first outdoor side expansion valve prior to change of the opening degree is LEV2$a$*,
an opening degree of the second outdoor side expansion valve prior to change of the opening degree is LEV2$b$*,
an opening degree of the first outdoor side expansion valve after a first opening degree change amount is added to LEV2$a$* is LEV2$a$,
an opening degree of the second outdoor side expansion valve after a second opening degree change amount is added to LEV2$b$* is LEV2$b$,
the controller
sets an opening degree change amount of each of the outdoor side expansion valves based on a superheat degree of the compressor of each heat source apparatus, the superheat degree being calculated using a pressure and temperature of refrigerant detected by a pressure detecting sensor and a temperature detecting sensor, respectively, that are disposed on one of a discharge side and a suction of side of the compressor of each heat source apparatus, and
increases or decreases a sum of opening degrees of the outdoor expansion valves of the plurality of heat source apparatuses by changing opening degrees of the outdoor expansion valves while maintaining a ratio between the opening degree change amounts of the outdoor side expansion valves in response to a temperature detected by the indoor unit temperature detecting sensor during a heating main operation in which one or more of the plurality of indoor units perform the cooling operation, whereas the remaining indoor units perform heating operation, and
when the temperature T5 detected by the indoor unit temperature detecting sensor is lower than a target value T5$m$, while a sum (LEV2$a$+LEV2$b$) of the values obtained by adding each of the opening degree change amounts to the respective opening degree prior to change of the first and second outdoor side expansion valves of the heat source apparatuses is larger than a sum (LEV2$a$*+LEV2$b$*) of the opening degrees prior to change of the first and second outdoor side expansion valves of the heat source apparatuses,
the controller determines a correction coefficient $\alpha$ satisfying a condition 0<$\alpha$<(LEV2$a$*+LEV2$b$*)/(LEV2$a$+LEV2$b$), and
the controller changes the opening degree of the first and second outdoor side expansion valves by a value obtained by multiplying the corresponding one of the opening degree change amounts ($\Delta$LEV2$a$, $\Delta$LEV2$b$) by the correction coefficient $\alpha$.

6. The air-conditioning apparatus of claim 5, wherein the controller sets the opening degree change amount of each of the outdoor side expansion valves based on a discharge superheat degree of the compressor of each heat source apparatus, the discharge superheat degree being calculated using the pressure and the temperature of the refrigerant discharged from the compressor of each heat source apparatus, as detected by the refrigerant pressure detecting sensor and the refrigerant temperature detecting sensor that are disposed on the discharge side of the compressor of each heat source apparatus.

7. The air-conditioning apparatus of claim 5, wherein the controller sets the opening degree change amount of each of the outdoor side expansion valves based on a superheat degree underneath a shell of the compressor of each heat source apparatus, the superheat degree underneath the shell being calculated using the pressure and the temperature of the refrigerant suctioned into the compressor of each heat source apparatus, as detected by the refrigerant pressure detecting sensor and the refrigerant temperature detecting sensor that are disposed on the suction side of the compressor of each heat source apparatus.

8. The air-conditioning apparatus of claim 5, wherein the first or second heat source apparatuses consist of a plurality of heat source apparatuses.

9. An air-conditioning apparatus comprising:
a plurality of heat source apparatuses each including a compressor, an outdoor side expansion valve, a heat source side heat exchanger, and an accumulator;
a plurality of indoor units each including an indoor heat exchanger and each configured to perform one of a cooling operation and a heating operation;
a relay device connected to the heat source apparatuses by a high pressure pipe and a low pressure pipe and configured to distribute refrigerant flowing therein from the heat source apparatuses to the plurality of indoor units; and
a controller configured to control operations of the heat source apparatuses, wherein:
the relay device includes
a gas-liquid separator configured to separate the refrigerant flowing from the high pressure pipe into gas refrigerant in a gas state and liquid refrigerant in a liquid state;
a gas pipe configured to supply the gas refrigerant exiting the gas-liquid separator to any indoor unit performing the heating operation from among the plurality of indoor units during a heating main operation in which one or more of the plurality of indoor units perform the cooling operation, whereas remaining indoor units perform the heating operation;
a liquid pipe configured to supply the liquid refrigerant flowing from the gas-liquid separator to the one or more indoor units performing the cooling operation from among the plurality of indoor units during the heating main operation;
a bypass pipe branching off from the liquid pipe and connected to the low pressure pipe;
a bypass flow control valve configured to regulate a flow volume of the refrigerant flowing through the bypass pipe; and
a relay device temperature detecting sensor configured to detect a temperature of the refrigerant flowing through the bypass pipe,
the plurality of heat source apparatuses include a first heat source apparatus including a first outdoor expansion valve and a second heat source apparatus including a second outdoor expansion valve,
an opening degree of the first outdoor side expansion valve prior to change of the opening degree is LEV2$a$*,
an opening degree of the second outdoor side expansion valve prior to change of the opening degree is LEV2$b$*,
an opening degree of the first outdoor side expansion valve after a first opening degree change amount is added to LEV2$a$* is LEV2$a$,
an opening degree of the second outdoor side expansion valve after a second opening degree change amount is added to LEV2$b$* is LEV2$b$,
during the heating main operation, the controller
sets an opening degree change amount of each of the outdoor side expansion valves based on a superheat degree of the compressor of each heat source apparatus, the superheat degree being calculated using a pressure and temperature of refrigerant detected by a pressure detecting sensor and a temperature detecting sensor, respectively, that are disposed on one of a discharge side and a suction of side of the compressor of each heat source apparatus, and
increases or decreases a sum of opening degrees of the outdoor side expansion valves of the plurality of heat source apparatuses by changing opening degrees of the outdoor expansion valves while maintaining a ratio between opening degree change amounts of the outdoor side expansion valves in response to the temperature detected by the relay device temperature detecting sensor, and
when a temperature T5 detected by the relay device temperature detecting sensor is higher than a target value T5$m$, while a sum (LEV2$a$+LEV2$b$) of the values obtained by adding each of the opening degree change amounts to the respective opening degree prior to change of the first and second outdoor side expansion valves of the heat source apparatuses is smaller than a sum (LEV2$a$*+LEV2$b$*) of the opening degrees prior to change of the first and second outdoor side expansion valves of the heat source apparatuses,
the controller determines a correction coefficient $\beta$ satisfying a condition (LEV2$a$+LEV2$b$)/(LEV2$a$*+LEV2$b$*)<$\beta$, and
the controller changes the opening degree of the first and second outdoor side expansion valves by a value obtained by multiplying the corresponding one of the opening degree change amounts ($\Delta$LEV2$a$, $\Delta$LEV2$b$) by the correction coefficient $\beta$.

10. The air-conditioning apparatus of claim 9, wherein the controller sets the opening degree change amount of each of the outdoor side expansion valves based on a discharge superheat degree of the compressor of each heat source apparatus, the discharge superheat degree being calculated using the pressure and the temperature of the refrigerant discharged from the compressor of each heat source apparatus, as detected by the refrigerant pressure detecting sensor and the refrigerant temperature detecting sensor that are disposed on the discharge side of the compressor of each heat source apparatus.

11. The air-conditioning apparatus of claim 9, wherein
the controller sets the opening degree change amount of each of the outdoor side expansion valves based on a superheat degree underneath a shell of the compressor of each heat source apparatus, the superheat degree underneath the shell being calculated using the pressure and the temperature of the refrigerant suctioned into the compressor of each heat source apparatus, as detected by the refrigerant pressure detecting sensor and the refrigerant temperature detecting sensor that are disposed on the suction side of the compressor of each heat source apparatus.

12. The air-conditioning apparatus of claim 9, wherein
the first or second heat source apparatuses consist of a plurality of heat source apparatuses.

13. An air-conditioning apparatus comprising:
a plurality of heat source apparatuses each including a compressor, an outdoor side expansion valve, a heat source side heat exchanger, and an accumulator;
a plurality of indoor units each including an indoor heat exchanger and an indoor side expansion valve and each configured to perform one of a cooling operation and a heating operation;
a relay device connected to the heat source apparatuses by a high pressure pipe and a low pressure pipe and configured to distribute refrigerant flowing therein from the heat source apparatuses to the plurality of indoor units; and
a controller configured to control operations of the heat source apparatuses, wherein:
each of the indoor units includes an indoor unit temperature detecting sensor provided between the indoor heat exchanger and the indoor side expansion valve and configured to detect a temperature of the indoor heat exchanger,
the plurality of heat source apparatuses include a first heat source apparatus including a first outdoor expansion valve and a second heat source apparatus including a second outdoor expansion valve,
an opening degree of the first outdoor side expansion valve prior to change of the opening degree is LEV2$a$*,
an opening degree of the second outdoor side expansion valve prior to change of the opening degree is LEV2$b$*,
an opening degree of the first outdoor side expansion valve after a first opening degree change amount is added to LEV2$a$* is LEV2$a$,
an opening degree of the second outdoor side expansion valve after a second opening degree change amount is added to LEV2$b$* is LEV2$b$,
the controller
sets an opening degree change amount of each of the outdoor side expansion valves based on a superheat degree of the compressor of each heat source apparatus, the superheat degree being calculated using a pressure and temperature of refrigerant detected by a pressure detecting sensor and a temperature detecting sensor, respectively, that are disposed on one of a discharge side and a suction of side of the compressor of each heat source apparatus, and
increases or decreases a sum of opening degrees of the outdoor expansion valves of the plurality of heat source apparatuses by changing opening degrees of the outdoor expansion valves while maintaining a ratio between the opening degree change amounts of the outdoor side expansion valves in response to a temperature detected by the indoor unit temperature detecting sensor during a heating main operation in which one or more of the plurality of indoor units perform the cooling operation, whereas the remaining indoor units perform heating operation, and
when the temperature T5 detected by the indoor unit temperature detecting sensor is higher than a target value T5$m$, while a sum (LEV2$a$+LEV2$b$) of the values obtained by adding each of the opening degree change amounts to the respective opening degree prior to change of the first and second outdoor side expansion valves of the heat source apparatuses is smaller than a sum (LEV2$a$*+LEV2$b$*) of the opening degrees prior to change of the first and second outdoor side expansion valves of the heat source apparatuses,
the controller determines a correction coefficient β satisfying a condition (LEV2$a$+LEV2$b$)/(LEV2$a$*+LEV2$b$*)<β, and
the controller changes the opening degree of each of the outdoor side expansion valves by a value obtained by multiplying the corresponding one of the opening degree change amounts (ΔLEV2$a$, ΔLEV2$b$) by the correction coefficient β.

14. The air-conditioning apparatus of claim 13, wherein
the controller sets the opening degree change amount of each of the outdoor side expansion valves based on a discharge superheat degree of the compressor of each heat source apparatus, the discharge superheat degree being calculated using the pressure and the temperature of the refrigerant discharged from the compressor of each heat source apparatus, as detected by the refrigerant pressure detecting sensor and the refrigerant temperature detecting sensor that are disposed on the discharge side of the compressor of each heat source apparatus.

15. The air-conditioning apparatus of claim 13, wherein
the controller sets the opening degree change amount of each of the outdoor side expansion valves based on a superheat degree underneath a shell of the compressor of each heat source apparatus, the superheat degree underneath the shell being calculated using the pressure and the temperature of the refrigerant suctioned into the compressor of each heat source apparatus, as detected by the refrigerant pressure detecting sensor and the refrigerant temperature detecting sensor that are disposed on the suction side of the compressor of each heat source apparatus.

16. The air-conditioning apparatus of claim 13, wherein
the first or second heat source apparatuses consist of a plurality of heat source apparatuses.

17. An air-conditioning apparatus comprising:
a plurality of heat source apparatuses each including a compressor, an outdoor side expansion valve, a heat source side heat exchanger, and an accumulator;
a plurality of indoor units each including an indoor heat exchanger and each configured to perform one of a cooling operation and a heating operation;
two or more of relay devices connected to the heat source apparatuses by a high pressure pipe and a low pressure pipe and configured to distribute refrigerant flowing therein from the heat source apparatuses to the plurality of indoor units; and
a controller configured to control operations of the heat source apparatuses, wherein:
at least one relay device includes
a gas-liquid separator configured to separate the refrigerant flowing from the high pressure pipe into gas refrigerant in a gas state and liquid refrigerant in a liquid state;

a gas pipe configured to supply the gas refrigerant exiting the gas-liquid separator to any indoor unit performing the heating operation from among the plurality of indoor units during a heating main operation in which one or more of the plurality of indoor units perform the cooling operation, whereas remaining indoor units perform the heating operation;

a liquid pipe configured to supply the liquid refrigerant flowing from the gas-liquid separator to the one or more indoor units performing the cooling operation from among the plurality of indoor units during the heating main operation;

a bypass pipe branching off from the liquid pipe and connected to the low pressure pipe;

a bypass flow control valve configured to regulate a flow volume of the refrigerant flowing through the bypass pipe; and a relay device temperature detecting sensor configured to detect a temperature of the refrigerant flowing through the bypass pipe, during the heating main operation, the controller sets an opening degree change amount of each of the outdoor side expansion valves based on superheat degree of the compressor of each heat source apparatus, the superheat degree being calculated using a pressure and a temperature of refrigerant detected by a refrigerant pressure detecting sensor and a refrigerant temperature detecting sensor, respectively, that are disposed on one of a discharge side and a suction of side of the compressor of each heat source apparatus, and increases or decreases a sum of opening degrees of the outdoor side expansion valves of the plurality of heat source apparatuses by changing opening degrees of the outdoor expansion valves while maintaining a ratio between opening degree change amounts of the outdoor side expansion valves in response to the temperature detected by the relay device temperature detecting sensor, and the controller changes the opening degree of each of the outdoor side expansion valves based on a temperature of one of the relay devices positioned closest to the heat source apparatuses.

18. The air-conditioning apparatus of claim 17, wherein the controller sets the opening degree change amount of each of the outdoor side expansion valves based on a discharge superheat degree of the compressor of each heat source apparatus, the discharge superheat degree being calculated using the pressure and the temperature of the refrigerant discharged from the compressor of each heat source apparatus, as detected by the refrigerant pressure detecting sensor and the refrigerant temperature detecting sensor that are disposed on the discharge side of the compressor of each heat source apparatus.

19. The air-conditioning apparatus of claim 17, wherein the controller sets the opening degree change amount of each of the outdoor side expansion valves based on a superheat degree underneath a shell of the compressor of each heat source apparatus, the superheat degree underneath the shell being calculated using the pressure and the temperature of the refrigerant suctioned into the compressor of each heat source apparatus, as detected by the refrigerant pressure detecting sensor and the refrigerant temperature detecting sensor that are disposed on the suction side of the compressor of each heat source apparatus.

20. The air-conditioning apparatus of claim 17, wherein the first or second heat source apparatuses consist of a plurality of heat source apparatuses.

* * * * *